United States Patent
Theriot et al.

(10) Patent No.: US 12,282,402 B2
(45) Date of Patent: Apr. 22, 2025

(54) DIAGNOSTIC BASELINING

(71) Applicant: Snap-on Incorporated, Kenosha, WI (US)

(72) Inventors: Mark Theriot, McHenry, IL (US); Patrick S. Merg, Hollister, CA (US); Roy Steven Brozovich, Campbell, CA (US); Bradley R. Lewis, Gilroy, CA (US)

(73) Assignee: Snap-on Incorporated, Kenosha, WI (US)

( * ) Notice: Subject to any disclaimer, the term of this patent is extended or adjusted under 35 U.S.C. 154(b) by 618 days.

(21) Appl. No.: 17/325,184

(22) Filed: May 19, 2021

(65) Prior Publication Data

US 2021/0279155 A1    Sep. 9, 2021

Related U.S. Application Data

(63) Continuation of application No. 14/260,929, filed on Apr. 24, 2014, now Pat. No. 11,048,604, which is a
(Continued)

(51) Int. Cl.
*G06F 11/30* (2006.01)
*G01M 17/00* (2006.01)
(Continued)

(52) U.S. Cl.
CPC .............. *G06F 11/30* (2013.01); *G01M 17/00* (2013.01); *G05B 23/0281* (2013.01); *G07C 5/0808* (2013.01)

(58) Field of Classification Search
CPC .... G06F 11/30; G01M 17/00; G05B 23/0281; G07C 5/0808
See application file for complete search history.

(56) References Cited

U.S. PATENT DOCUMENTS 5,299,550 A    4/1994    Inoue
5,520,160 A    5/1996    Aota et al.
(Continued)

FOREIGN PATENT DOCUMENTS

CN    1627286 A    6/2005
CN    1661352 A    8/2005
(Continued)

OTHER PUBLICATIONS

CN-1945257-B_translated (Year: 2010).*
(Continued)

*Primary Examiner* — Natalie Huls
*Assistant Examiner* — Michael J Singletary
(74) *Attorney, Agent, or Firm* — McDonnell Boehnen Hulbert & Berghoff LLP

(57) ABSTRACT

Disclosed are methods and devices related to diagnosing a device-under-service (DUS) are disclosed. DUS-related data is received. The DUS-related data is determined to be aggregated into aggregated data based on a determined classification of the DUS-related data. An aggregated-data comparison of the DUS-related data and aggregated data is generated. The aggregated-data comparison can include a statistical analysis of the DUS-related data and/or a differential analysis of DUS-related data taken while the DUS is operating in two or more operating states. A DUS report is generated based on the aggregated-data comparison. The DUS report can include one or more sub-strategies. At least one of the one or more sub-strategies can include a sub-strategy-success estimate. The DUS report can be sent and a DUS-report display can be generated based on the DUS report.

20 Claims, 14 Drawing Sheets

Related U.S. Application Data continuation of application No. 13/031,565, filed on Feb. 21, 2011, now abandoned.

(51) Int. Cl.
  *G05B 23/02* (2006.01)
  *G07C 5/08* (2006.01)

(56) References Cited

U.S. PATENT DOCUMENTS

| | | | |
|---|---|---|---|
| 5,574,828 | A | 11/1996 | Hayward et al. |
| 6,301,531 | B1 | 10/2001 | Pierro et al. |
| 6,513,025 | B1 | 1/2003 | Rosen |
| 6,760,659 | B1 | 7/2004 | Cowen |
| 6,850,071 | B1 | 2/2005 | Pederson et al. |
| 7,444,216 | B2 | 10/2008 | Rogers et al. |
| 7,487,035 | B2 | 2/2009 | Nozawa et al. |
| 7,542,832 | B2 | 6/2009 | Nou |
| 7,801,671 | B1 | 9/2010 | Pederson et al. |
| 7,945,438 | B2 | 5/2011 | Balmeli et al. |
| 8,095,261 | B2 | 1/2012 | Howell et al. |
| 8,620,511 | B2 * | 12/2013 | Rother .......... G01M 17/007 714/25 |
| 8,930,064 | B2 * | 1/2015 | Merg ............ G07C 5/0825 701/29.6 |
| 2002/0007237 | A1 * | 1/2002 | Phung ........... G05B 23/0275 709/219 |
| 2002/0007289 | A1 | 1/2002 | Malin et al. |
| 2002/0016655 | A1 | 2/2002 | Joao |
| 2003/0045992 | A1 | 3/2003 | Humerickhouse et al. |
| 2003/0107548 | A1 * | 6/2003 | Eun ............. G07C 5/0808 345/156 |
| 2005/0149566 | A1 | 7/2005 | Baek et al. |
| 2005/0192722 | A1 * | 9/2005 | Noguchi ......... G07C 5/0808 701/33.4 |
| 2005/0257086 | A1 | 11/2005 | Triou, Jr. et al. |
| 2006/0095230 | A1 | 5/2006 | Grier et al. |
| 2006/0149434 | A1 | 7/2006 | Bertosa et al. |
| 2007/0156311 | A1 | 7/2007 | Elcock et al. |
| 2007/0233341 | A1 | 10/2007 | Logsdon |
| 2007/0244841 | A1 | 10/2007 | Vatchkov et al. |
| 2007/0294003 | A1 | 12/2007 | Underdal et al. |
| 2008/0004764 | A1 | 1/2008 | Chinnadurai et al. |
| 2008/0110239 | A1 | 5/2008 | Maegawa |
| 2008/0133288 | A1 | 6/2008 | Thibaux et al. |
| 2008/0243488 | A1 | 10/2008 | Balmeli et al. |
| 2009/0058857 | A1 | 3/2009 | Ballantyne |
| 2010/0057292 | A1 | 3/2010 | Ishikawa et al. |
| 2010/0138701 | A1 | 6/2010 | Costantino |
| 2010/0228423 | A1 | 9/2010 | Howell et al. |
| 2011/0077817 | A1 * | 3/2011 | Sun ............. G07C 5/0808 701/29.2 |
| 2011/0313809 | A1 | 12/2011 | Baek et al. |
| 2012/0053778 | A1 * | 3/2012 | Colvin ........... G07C 5/006 701/31.4 |
| 2012/0136527 | A1 | 5/2012 | McQuade et al. |
| 2012/0136743 | A1 | 5/2012 | McQuade et al. |
| 2012/0136802 | A1 * | 5/2012 | McQuade ........ B60K 35/00 705/347 |
| 2012/0215491 | A1 | 8/2012 | Theriot et al. |
| 2014/0244213 | A1 | 8/2014 | Theriot et al. |

FOREIGN PATENT DOCUMENTS

| | | | | |
|---|---|---|---|---|
| CN | 101027617 | A | 8/2007 | |
| CN | 101660974 | A | 3/2010 | |
| CN | 1945257 | B * | 8/2010 | ......... H04L 43/0811 |
| CN | 101826135 | A | 9/2010 | |
| EP | 1 569 176 | | 8/2005 | |
| JP | 6225234 | A | 2/1987 | |

OTHER PUBLICATIONS

International Preliminary Report on Patentability and Written Opinion for PCT Pat. App. No. PCT/US2012/025802, issued Aug. 21, 2013.

Sankavaram, Chaitanya et al., "Event-driven Data Mining Techniques for Automotive Fault Diagnosis," 21st International Workshop on Principles of Diagnosis, pp. 1-8 (Oct. 13-16, 2010).

International Searching Authority, Invitation to Pay Additional Fees for PCT/US2012/025802 mailed Jul. 11, 2012, 8 pages.

Auterra, LLC, "DashDyny SPD Automotive Computer", last visited Feb. 21, 2011, available at http://www.auterraweb.com/.

dealextreme.com, "ELM327 Bluetooth OBD-11 Transceiver Dongle", Oct. 22, 2008, available at http://www.dealextremen.com/p/elm327-bluetooth-obd-ii-wireless-transceiver-dongle-16921 (last visited Feb. 21, 2011).

Automotive Test Solutions, Inc. "EScan—Automotive Test Solutions", 2006, available at http://atsnm.com/escan.htm (last visited Feb. 21, 2011).

A.K. Jain et al., "Statistical Pattern Recognition: A Review", IEEE Transaction on Pattern Analysis and Machine Intelligence, vol. 22, No. 1, Jan. 2000, pp. 4-37.

K. Layne, "Reading a Vacuum Gauge", Motor, Aug. 2001, pp. 47-50, available at http://www.motor.com/magazine/pdfs/082001_05.pdf (last visited Feb. 21, 2011).

Snap-On Inc., "Verdict User Manual", EAZ0063L05A Rev. A, Aug. 2010.

Wikipedia, "Expert System", Oct. 5, 2010, available at http://en.wikipedia.org/wiki/Expert_system (last visited Oct. 6, 2010).

Wikipedia, "Inference Engine", Jun. 21, 2010, available at http://en.wikipedia.org/wiki/Inference_engine (last visited Oct. 6, 2010).

Wikipedia, "Pearson product-moment correlation coefficient", Feb. 18, 2011, available at http://en.wikipedia.org/wiki/Pearson_product-moment_correlation_coefficient (last visited Feb. 21, 2011).

Seo, Songwon; A review and comparison of methods for detecting outliers in univariate date sets; University of Pittsburgh; 2006; pp. i to vii and 1 to 53; Patent Office in P.R. China cited to pp. iii, 1, 9, and 10 in Chinese Patent Application No. 201280019046.

State Intellectual Property Office (SIPO) of the People's Republic of China; office action and search report for Chinese patent application No. 201280019046-7 dated May 5, 2016.

State Intellectual Property Office (SIPO) of the People's Republic of China; office action and search report for Chinese patent application No. 201280019046.7 dated Sep. 6, 2015.

State Intellectual Property Office (SIPO) of the People's Republic of China; office action and search report for Chinese patent application No. 201280019046.7 dated Feb. 2, 2015.

English Translation of office action for Brazilian patent application No. BR 11 2013 020413 3, mailed Nov. 12, 2019.

European Patent Office; communication under Rule 164(2)(a) EPC for European patent application No. 12 716 731.0-1953, dated Mar. 2, 2017.

European Patent Office; decision to grant a European patent pursuant to Article 97(1) EPC for European patent application No. 12716731.0-1115 / 2678832, dated Mar. 14, 2019.

European Patent Office; Communication pursuant to Rule 164(2)(b) and Article 94(3) EPC for European patent application No. 12 716 731.0-1953, dated Jun. 26, 2017.

Canadian Intellectual Property Office; office action for Canadian patent application No. 2,827,893 dated Oct. 5, 2018.

Canadian Intellectual Property Office; office action for Canadian patent application No. 2,827,893 dated Oct. 19, 2018.

Canadian Intellectual Property Office; office action for Canadian patent application No. 2,827,893 dated Aug. 21, 2020.

Canadian Intellectual Property Office; office action for Canadian patent application No. 2,827,893 dated Sep. 27, 2019.

U.S. Appl. No. 61/377,865; inventors: Charles Michael McQuade, Brett Brinton, and Greg Colvin, filed Aug. 27, 2010.

* cited by examiner

DIAGNOSTIC BASELINING

CROSS-REFERENCE TO RELATED APPLICATIONS

This application is a continuation of U.S. patent application Ser. No. 14/260,929, entitled "Diagnostic Baselining", filed Apr. 24, 2014, and published as United States Patent Application Publication No. 2014/0244213 A1 on Aug. 28, 2014. U.S. patent application Ser. No. 14/260,929 is a continuation of U.S. patent application Ser. No. 13/031,565, entitled "Diagnostic Baselining", filed Feb. 21, 2011, published as United States Patent Application Publication No. 2012/0215491 A1 on Aug. 23, 2012. U.S. patent application Ser. No. 13/031,565, U.S. patent application Ser. No. 14/260,929, United States Patent Application Publication No. 2012/0215491 A1, and United States Patent Application Publication No. 2014/0244213 A1 are incorporated herein by reference.

BACKGROUND

Vehicles, such as automobiles, light-duty trucks, and heavy-duty trucks, play an important role in the lives of many people. To keep vehicles operational, some of those people rely on vehicle technicians to diagnose and repair their vehicle.

Vehicle technicians use a variety of tools in order to diagnose and/or repair vehicles. Those tools may include common hand tools, such as wrenches, hammers, pliers, screwdrivers and socket sets, or more vehicle-specific tools, such as cylinder hones, piston-ring compressors, and vehicle brake tools. The tools used by vehicle technicians may also include electronic tools such as a vehicle scan tool or a digital voltage-ohm meter (DVOM), for use diagnosing and/or repairing a vehicle.

The vehicle scan tool and/or DVOM can be linked via wired and/or wireless link(s) to other devices, perhaps to communicate data about the vehicle. The vehicle scan tool and/or DVOM can provide a significant amount of data to aid diagnosis and repair of the vehicle. Typically, the data does not include contextual data, such as historical information. Further, the data is typically formatted such that data interpretation by skilled personnel, such as a vehicle technician, is required before a problem with the vehicle can be identified, diagnosed, and/or repaired.

Overview

Various example embodiments are described in this description. In one respect, an example embodiment can take the form of a method. At a server device, device-under-service (DUS) related data is received for a DUS. The DUS-related data is determined to be aggregated into aggregated data at the server device. The determination that the DUS-related data is to be aggregated is based on a classification of the DUS-related data. An aggregated-data comparison of the DUS-related data and the aggregated data is generated at the server device. A DUS report based on the aggregated-data comparison is then generated at the server device. The DUS report includes one or more sub-strategies. At least one of the one or more sub-strategies includes a sub-strategy-success estimate. The DUS report is then sent from the server device.

In a second respect, an example embodiment can take the form of a client device that includes a memory, a processor, and instructions. The instructions are stored in the memory. In response to execution by the processor, the instructions cause the client device to perform functions. The functions can include: (a) receiving a diagnostic request for a DUS, (b) sending, to the DUS, a DUS-test request to perform a test related to the diagnostic request, (c) receiving, from the DUS, DUS-related data based on the test, (d) sending the DUS-related data, (e) receiving a DUS report based on the DUS-related data, and (f) generating a DUS-report display of the DUS report.

In a third respect, an example embodiment can take the form of a method. A device receives a diagnostic request to diagnose a DUS. A test based on the diagnostic request is determined at the device. The test is related to a first operating state of the DUS. The device requests performance of the test at the first operating state of the DUS. First-operating-state data for the DUS is received at the device. The first-operating-state data is based on the test. Performance of the test at the second operating state of the DUS is requested by the client device. The device verifies that the first-operating-state data is or is not related to the first operating state. In response to verifying that the first-operating-state data is related to the first operating state, the device (a) generates a differential analysis based on the first-operating-state data, (b) generates a DUS-report display based on the differential analysis, and (c) sends the DUS-report display.

These as well as other aspects and advantages will become apparent to those of ordinary skill in the art by reading the following detailed description, with reference where appropriate to the accompanying drawings. Further, it should be understood that the embodiments described in this overview and elsewhere are intended to be examples only and do not necessarily limit the scope of the invention.

BRIEF DESCRIPTION OF THE DRAWINGS

Example embodiments are described herein with reference to the drawings, wherein like numerals denote like entities, in which.

DETAILED DESCRIPTION

I. Introduction

Figure 1:
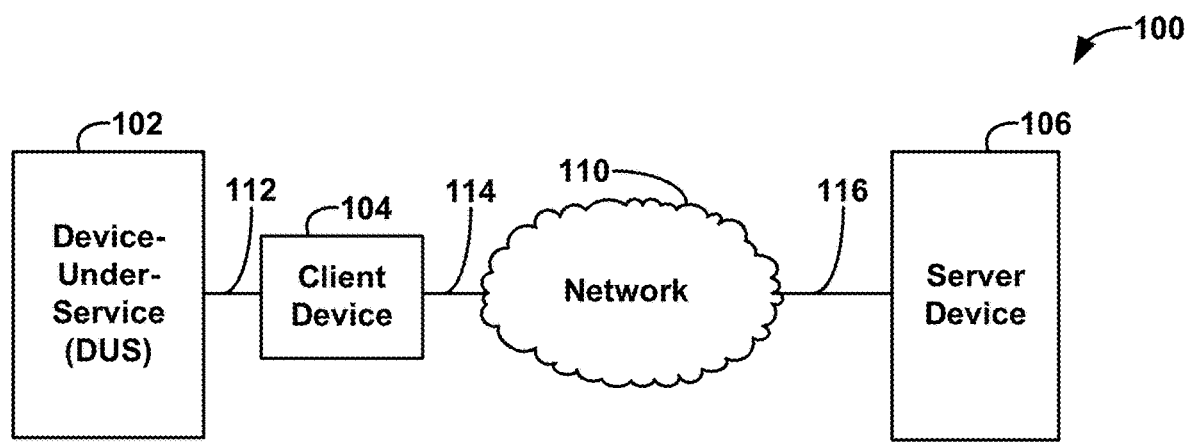
FIG. 1 is a block diagram of an example system.

This description sets forth systems comprising multiple devices. Each device of a described system is operable independently (e.g., as a stand-alone device) as well as in combination with other devices of the system. Each device of a described system can be referred to as an apparatus.

Each device of a described system is operable to carry out functions for servicing a DUS (DUS). The DUS can comprise a vehicle, a refrigeration unit, a personal computer, or some other serviceable device. Additionally or alternatively, the DUS can comprise a system such as a heating, ventilation, and air conditioning (HVAC) system, a security system, a computer system (e.g., a network), or some other serviceable system. The functions for servicing the DUS can include but are not limited to diagnostic functions, measurement functions, and scanning functions.

To work in combination with each other, the device of a described system is configured to communicate with another device via a communications network. The communications network can comprise a wireless network, a wired network, or both a wireless network and a wired network. Data obtained by a device from the DUS or data otherwise contained in that device can be transmitted to another device via the communications network between those devices.

Devices in the described system can be connected via wired and/or wireless connections. Wired and wireless connections can utilize one or more communication protocols arranged according to one or more standards, such as an SAE International, International Organization for Standardization (ISO), or Institute of Electrical and Electronics Engineers (IEEE) 802 standard. The wired connection can be established using one or more wired communication protocols, such as the On-Board Diagnostic II ("OBD-II") series of protocols (e.g., SAE J1850, SAE J2284, ISO 9141-2, ISO 14230, ISO 15765), IEEE 802.3 ("Ethernet"), or IEEE 802.5 ("Token Ring"). The wireless connection can be established using one or more wireless communication protocols, such as Bluetooth, IEEE 802.11 ("Wi-Fi"), or IEEE 802.16 ("WiMax").

A client device of the described system is configured to communicate directly with the DUS; in part by sending test requests for diagnostic information and receiving test-related data in response. In some embodiments, the test requests and/or test-related data are formatted according to an OBD-II protocol.

The client device can prompt operation of the DUS at a variety of operating conditions to collect the test-related data. The conditions and amount of data collected can be tailored based on a type of user (e.g., service technician, layperson, engineer, etc.) using the client device. The client device can also collect a "complaint" about the DUS, which can include text about the operating condition of the DUS. In some embodiments, a complaint can be specified as a "complaint code", such as an alphanumeric code.

A server device of the described system is configured to receive the test-related data and perhaps "device-related data" for the DUS and responsively generate a "DUS report." The DUS report can include a "strategy" for diagnosing and/or repairing the DUS to address a complaint. The strategy may include a "statistical analysis" of the received test-related data and/or one or more "sub-strategies" (e.g., recommendations, directions, proposed actions, and/or additional tests). The device-related data can include, but is not limited to data for device make, device manufacturer identity, device model, device time of manufacture (e.g., model year), mileage, device control unit information (e.g., for a vehicle, engine control unit (ECU) type and release information), time-of-operation data, device-identity information, device-owner-identity information, service provider, service location, service technician, and/or device location. In some embodiments, the client device can generate the DUS report.

The server device and/or the client device can create a "profile" for the DUS. The profile can be configured to store the device-related data related to the DUS, complaints, DUS reports, and/or test-related data taken at various times during the life of the DUS.

In some embodiments, "reference points" or "reference data" is stored, perhaps with the profile. The reference data can be taken during an interval of complaint-free operation of the DUS. Reference data can include data provided by an original equipment manufacturer (OEM) regarding ideal/recommended operating In some embodiments, a "data logger" can be installed on the DUS to collect the reference data. In these embodiments, once the reference data is collected, the reference data can be communicated from the data logger to a "service provider" responsible for diagnosis, maintenance, and/or repair of the DUS. In other embodiments, the service provider collects the baseline data at a service facility.

The reference data can be compared with test-related data taken in response to a complaint about the DUS. Further, reference data and/or test-related data from a number of devices-under-service can be combined and/or aggregated into a set of "aggregated data." The aggregation process can include determining a classification and/or reliability for the aggregated data.

Test-related data can be "classified" before being added to the aggregated data. Example classifications of aggregated data can include a reference data classification and one or more diagnostic classifications. For example, if the DUS is operating without complaint, test-related data obtained from the DUS can be classified as reference data upon aggregation into the aggregated data. However, if the DUS is operating with a fault in the braking system, test-related data from the DUS can be classified as "faulty brake" data upon aggregation into the aggregated data. Many other types of classifications are possible as well.

Reference data for a DUS and perhaps other data can used in generation of "baseline data" for a DUS. The baseline data can include a statistical summary over data taken for devices that share "core-device information" (e.g., year, model, make, and/or ECU type/release information). The baseline data can get aggregated and/or updated over time. For example, as more test-related data is aggregated for devices under service that share core-device information, the baseline data can have higher confidence values and/or intervals for aggregated baseline data over time.

Other data than baseline data that share a common classification can be aggregated as well. For example, the "faulty brake" data can get aggregated and, as more faulty brake data is aggregated over time, the faulty brake data can have increasingly higher confidence values and/or intervals for aggregated faulty-brake data over time. Data aggregation for other classifications is possible as well.

The DUS report can be generated based on a comparison of the test-related data and aggregated data. For example, the server device can store aggregated data, perhaps including core-device information and/or baseline data for the DUS. Upon reception of test-related data and a complaint, the server device can determine a subset of the aggregated data based on the device-related data for the DUS. Then, the test-related data and the determined subset of aggregated data can be compared to determine the statistical analysis, including a number of statistics for the test-related data, for the DUS report.

In some embodiments, the statistical analysis can be generated based on a "differential analysis" or comparison of the DUS operated in one or more "operating states." Example operating states for an engine of a vehicle (acting as a DUS) include no-load/lightly-loaded operating states (e.g., an "idle" operating state), various operating states under normal loads (e.g., a "cruising" operating state, a "cranking" operating state), and operating states at or near maximum load (e.g., a "high-speed" operating state). Other operating states are possible as well. Then, the statistical analysis can be determined based on differences in test-related data as the DUS operated in the operating state at two or more different times and/or between two or more different measurements.

A "rules engine" can take the statistical analysis and information about the complaint, evaluate the statistical analysis in light of one or more rules about the DUS and the complaint data, and provide a strategy to investigate the complaint. In some embodiments, the rules engine can include an inference engine, such as an expert system or problem-solving system, with a knowledge base related at least to evaluation, diagnosis, operation, and/or repair of the DUS.

The rules engine can generate the DUS report, perhaps by combining the statistical analysis and the strategy for addressing the complaint. The client device and/or the server device can include the rules engine. In some embodiments, the rules engine of the client device differs from the rules engine of the server device.

The DUS report can be displayed, perhaps on the client device, perhaps to permit carrying out a strategy of the DUS report. Feedback regarding sub-strategies of the strategy can be provided and used to adjust a "sub-strategy-success estimate" or likelihood that the sub-strategy can address a problem mentioned in the complaint data. Such sub-strategy-success estimates can be provided with the DUS report.

By performing statistical analyses of aggregated data (including baseline data) test-related data, this system can evaluate the test-related data in the context of a larger population of data. By comparing the test-related data with classified aggregated data and/or baseline data, any discrepancies between the classified aggregated data and/or baseline data and the test-related data as shown in the statistical analysis can be more readily identified and thus speed diagnosis and repair of the DUS. By performing differential analyses using a testing procedure of merely operating a DUS in an operating state and/or at two (or more) different times/sources (e.g., aggregated/baseline data and test-related data), initial diagnostic procedures can be simplified. A strategy provided with the DUS report can include sub-strategies for diagnosis and/or repair of the DUS, further decreasing time to repair. By providing a statistical analysis and/or differential analysis based on a population of data, along with a strategy for diagnosis and repair, the device-under-repair report greatly reduces, if not eliminates, guess work about the test-related data, and reduces down time for the device-under-repair.

II. Example Architecture

FIG. 1 is a block diagram of an example system 100. System 100 comprises device-under-service (DUS) 102 and devices 104 and 106. For purposes of this description, device 104 is referred to as a client device and device 106 is referred to as a server device.

The block diagram of FIG. 1 and other diagrams and flow charts accompanying this description are provided merely as examples and are not intended to be limiting. Many of the elements illustrated in the figures and/or described herein are functional elements that may be implemented as discrete or distributed components or in conjunction with other components, and in any suitable combination and location. Those skilled in the art will appreciate that other arrangements and elements (for example, machines, interfaces, functions, orders, and groupings of functions, etc.) can be used instead. In particular, some or all of the functionality described herein as client device functionality (and/or functionality of components of a client device) may be implemented by a server device, and some or all of the functionality described herein as server device functionality (and/or functionality of components of a server device) may be implemented by a client device.

Furthermore, various functions, techniques, and functionality described herein as being performed by one or more elements can be carried out by a processor executing computer-readable program instructions and/or by any combination of hardware, firmware, and software.

DUS 102 can comprise a vehicle, such as an automobile, a motorcycle, a semi-tractor, farm machinery, or some other vehicle. System 100 is operable to carry out a variety of functions, including functions for servicing DUS 102. The example embodiments can include or be utilized with any appropriate voltage or current source, such as a battery, an alternator, a fuel cell, and the like, providing any appropriate current and/or voltage, such as about 12 volts, about 42 volts, and the like. The example embodiments can be used with any desired system or engine. Those systems or engines can comprise items utilizing fossil fuels, such as gasoline, natural gas, propane, and the like, electricity, such as that generated by battery, magneto, fuel cell, solar cell and the like, wind and hybrids or combinations thereof. Those systems or engines can be incorporated into other systems, such as an automobile, a truck, a boat or ship, a motorcycle, a generator, an airplane and the like.

Client device 104 and/or server device 106 can be computing devices, such as example computing device 200 described below in the context of FIG. 2. In some embodiments, client device 104 comprises a digital volt meter (DVM), a digital volt ohm meter (DVOM), and/or some other type of measurement device.

Network 110 can be established to communicatively link devices 104 and 106. Any one of these devices can communicate via network 110 once the device establishes a connection or link with network 110. As an example, FIG. 1 shows network 110 connected to: client device 104 via link 114 and device 106 connected via link 116. In embodiments not shown in FIG. 1, DUS 102 can be connected to network 110 as well.

Network 110 can include and/or connect to a data network, such as a wide area network (WAN), a local area network (LAN), one or more public communication networks, such as the Internet, one or more private communication networks, or any combination of such networks. Network 110 can include wired and/or wireless links and/or devices utilizing one or more communication protocols arranged according to one or more standards, such as an SAE International, International Organization for Standardization (ISO), or Institute of Electrical and Electronics Engineers (IEEE) standard.

Network 110 can be arranged to carry out communications according to a respective air-interface protocol. Each air-interface protocol can be arranged according to an industry standard, such as an Institute of Electrical and Electronics Engineers (IEEE) 802 standard. The IEEE 802 standard can comprise an IEEE 802.11 standard for Wireless Local Area Networks (e.g., IEEE 802.11 a, b, g, or n), an IEEE 802.15 standard for Wireless Personal Area Networks, an IEEE 802.15.1 standard for Wireless Personal Area Networks—Task Group 1, an IEEE 802.15.4 standard for Wireless Personal Area Networks—Task Group 4, an IEEE 802.16 standard for Broadband Wireless Metropolitan Area Networks, or some other IEEE 802 standard. For purposes of this description, a wireless network (or link) arranged to carry out communications according to an IEEE 802.11 standard is referred to as a Wi-Fi network (or link), a wireless network (or link) arranged to carry out communications according to an IEEE 802.15.1 standard is referred to as a Bluetooth network (or link), a wireless network (or link) arranged to carry out communications according to an IEEE 802.15.4 standard is referred to as a Zigbee network (or link), and a wireless network (or link) arranged to carry out communications according to an IEEE 802.16 standard is referred to as a Wi-Max network (or link).

Network 110 can be arranged to carry out communications according to a wired communication protocol. Each wired communication protocol can be arranged according to an industry standard, such as IEEE 802.3 ("Ethernet") or IEEE 802.5 ("Token Ring"). For purposes of this description, a wired network (or link) arranged to carry out communications according to an OBD-II protocol is referred to as an OBD-II network (or link), a wired network (or link) arranged to carry out communications according to an IEEE 802.3 standard is referred to as an Ethernet network (or link), and a wired network (or link) arranged to carry out communications according to an IEEE 802.5 standard is referred to as a Token Ring network (or link).

As such, wireless links to network 110 can be established using one or more wireless air interface communication protocols, such as but not limited to, Bluetooth, Wi-Fi, Zigbee, and/or WiMax. Similarly, wired links to network 110 can be established using one or more wired communication protocols, such as but not limited to, Ethernet and/or Token Ring. As such, links 114 and 116 can be wired and/or wireless links to network 110. Additional wired and/or wireless links and/or protocols now known or later developed can be used in network 110 as well.

In some embodiments not shown in FIG. 1, point-to-point wired and/or wireless links can be established between client device 104 and server device 106. In such embodiments, herein-described functionality of network 110 can be performed by these point-to-point links. In other embodiments not shown in FIG. 1, additional devices not shown in FIG. 1 (e.g., computing device, smartphone, personal digital assistant, telephone, etc.), can communicate with DUS 102, client device 104, server device 106, and/or other devices via network 110. Client device 104 and/or server device 106 can operate to communicate herein-described data, reports, requests, queries, profiles, displays, analyses, and/or other data (e.g., automobile repair data and/or instruction data) to one or more of these additional devices not shown in FIG. 1.

Client device 104 can connect to DUS 102 via link 112. In some embodiments, link 112 is a wired connection to DUS 102, perhaps an OBD-II link or Ethernet link. In other embodiments, link 112 is a wireless link. In some of these embodiments, the wireless link is configured to convey at least data formatted in accordance with an OBD-II protocol. For example, an "OBD-II scanner" can be utilized to convey OBD-II data via a wireless link. The OBD-II scanner is a device with a wired OBD-II link to DUS 102 and a wireless transmitter. The OBD-II scanner can retrieve data formatted in accordance with an OBD-II protocol from DUS 102 and transmit the OBD-II formatted data via a wireless link (e.g., a Bluetooth, Wi-Fi, or Zigbee link) established using the wireless transmitter. An example OBD-II scanner is the VERDICT S3 Wireless Scanner Module manufactured by Snap-on Incorporated of Kenosha, Wis. In some embodiments, protocols other than an OBD-II protocol now known or later developed can be specify data formats and/or transmission.

In another example, a data logger (not shown in FIG. 1) can be used to collect data from DUS 102 while in operation. Once link 112 to DUS 102 is connected, the data logger can communicate the collected data to client device 104 and perhaps server device 106.

Figure 2:
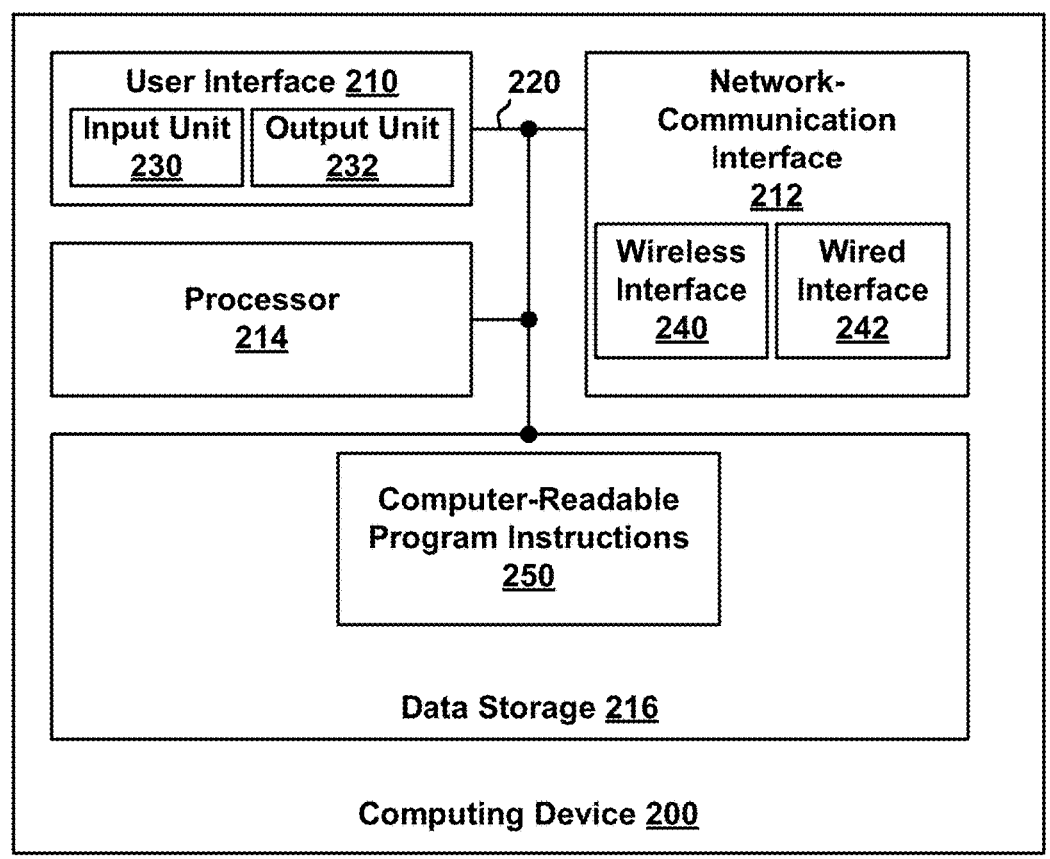
FIG. 2 is a block diagram of an example computing device.

FIG. 2 is a block diagram of an example computing device 200. As illustrated in FIG. 2, computing device 200 includes a user interface 210, a network-communication interface 212, a processor 214, and data storage 216, all of which may be linked together via a system bus, network, or other connection mechanism 220.

User interface 210 is operable to present data to and/or receive data from a user of computing device 200. The user interface 200 can include input unit 230 and/or output unit 232. Input unit 230 can receive input, perhaps from a user of the computing device 200. Input unit 230 can comprise a keyboard, a keypad, a touch screen, a computer mouse, a track ball, a joystick, and/or other similar devices, now known or later developed, capable of receiving input at computing device 200.

Output unit 232 can provide output, perhaps to a user of the computing device 200. Output unit 232 can comprise a visible output device for generating visual output(s), such as one or more cathode ray tubes (CRT), liquid crystal displays (LCD), light emitting diodes (LEDs), displays using digital light processing (DLP) technology, printers, light bulbs, and/or other similar devices, now known or later developed, capable of displaying graphical, textual, and/or numerical information. Output unit 232 can alternately or additionally comprise one or more aural output devices for generating audible output(s), such as a speaker, speaker jack, audio output port, audio output device, earphones, and/or other similar devices, now known or later developed, capable of conveying sound and/or audible information.

Network-communication interface 212 can include wireless interface 240 and/or wired interface 242, perhaps for communicating via network 110 and/or via point-to-point link(s). Wireless interface 240 can include a Bluetooth transceiver, a Zigbee transceiver, a Wi-Fi transceiver, a WiMAX transceiver, and/or some other type of wireless transceiver. Wireless interface 240 can carry out communications with devices 102, 104, 106, network 110, and/or other device(s) configured to communicate wirelessly.

Wired interface 242 can be configured to communicate according to a wired communication protocol (e.g., Ethernet, OBD-II Token Ring) with devices 102, 104, and/or 106, network 110, and/or other device(s) configured to communicate via wired links. Wired interface 242 can comprise a port, a wire, a cable, a fiber-optic link or a similar physical connection to devices 102, 104, 106, network 110, and/or other device(s) configured to communicate via wire.

In some embodiments, wired interface 242 comprises a Universal Serial Bus (USB) port. The USB port can communicatively connect to a first end of a USB cable, while a second end of the USB cable can communicatively connect to a USB port of another device connected to network 110 or some other device. In other embodiments, wired interface 242 comprises an Ethernet port. The Ethernet port can communicatively connect to a first end of an Ethernet cable, while a second end of the Ethernet cable can communicatively connect to an Ethernet port of another device connected to network 110 or some other device.

In some embodiments, network-communication interface 212 can provide reliable, secured, and/or authenticated communications. For each communication described herein, information for ensuring reliable communications (i.e., guaranteed message delivery) can be provided, perhaps as part of a message header and/or footer (e.g., packet/message sequencing information, encapsulation header(s) and/or footer(s), size/time information, and transmission verification information such as cyclic redundancy check (CRC) and/or parity check values). Communications can be made secure (e.g., be encoded or encrypted) and/or decrypted/decoded using one or more cryptographic protocols and/or algorithms, such as, but not limited to, DES, AES, RSA, Diffie-Hellman, and/or DSA. Other cryptographic protocols and/or algorithms may be used as well or in addition to those listed herein to secure (and then decrypt/decode) communications.

Processor 214 may comprise one or more general purpose processors (e.g., microprocessors manufactured by Intel or Advanced Micro Devices) and/or one or more special purpose processors (e.g., digital signal processors). Processor 214 may execute computer-readable program instructions 250 that are contained in data storage 216 and/or other instructions as described herein.

Data storage 216 can comprise one or more computer-readable storage media readable by at least processor 214. The one or more computer-readable storage media can comprise volatile and/or non-volatile storage components, such as optical, magnetic, organic or other memory or disc storage, which can be integrated in whole or in part with processor 214. In some embodiments, data storage 216 is implemented using one physical device (e.g., one optical, magnetic, organic or other memory or disc storage unit), while in other embodiments data storage 216 is implemented using two or more physical devices.

Data storage 216 can include computer-readable program instructions 250 and perhaps data. Computer-readable program instructions 250 can include instructions executable by processor 214 and any storage required, respectively, to perform at least part of the herein-described techniques and/or at least part of the functionality of the herein-described devices and networks.

Figure 3:
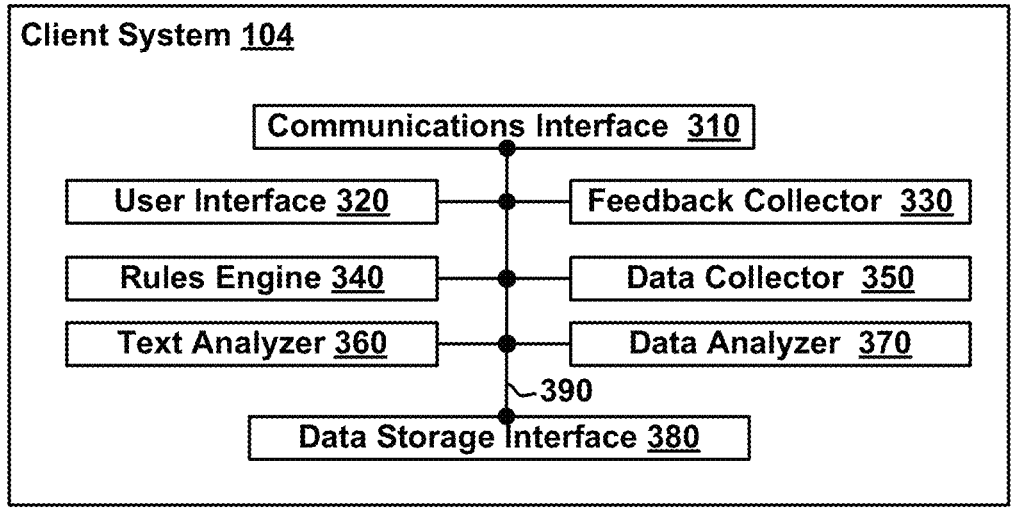
FIG. 3 is a block diagram of an example client device.

FIG. 3 is a block diagram of an example client device 104. Client device 104 can include communications interface 310, user interface 320, feedback collector 330, rules engine 340, data collector 350, text analyzer 360, data analyzer 370, and data storage interface 380, all connected via interconnect 390.

The arrangement of components of client device 104 as shown in FIG. 3 is an example arrangement. In other embodiments, client device 104 can utilize more or fewer components than shown in FIG. 3 to perform the herein-described functionality of client device 104.

Communications interface 310 is configured to enable communications between client device 104 and other devices, perhaps including enabling reliable, secured, and/or authenticated communications. An example communication interface 310 is network-communication interface 212, described above in the context of FIG. 2. User interface 320 is configured to enable communications between client device 104 and a user of client device 104, including but not limited to, communicating reports (including data analysis, strategies, and/or sub-strategies), requests, messages, feedback, information and/or instructions described herein. An example user interface 320 is user interface 210, described above in the context of FIG. 2.

Feedback collector 330 is configured to request, receive, store, and/or retrieve "feedback" or input on reports, strategies, and/or sub-strategies as described herein.

Rules engine 340 is configured to receive data, analyze the received data, and generate corresponding DUS reports. The received data can include, but is not limited to, the complaint data, unprocessed test-related data, processed test-related data (e.g., a statistical or differential analysis of test-related data), reference data, classifications/reliability determinations of received data, predetermined data values (e.g., hard-coded data), and/or other data.

The received data can be analyzed by matching the received data with one or more rules and/or an existing population of data. The one or more rules can be stored in a diagnostic rules and strategy data base. A query to the rules and strategy data base regarding received data (e.g., a complaint) can return one or more rules and perhaps one or more sub-strategies related to the complaint.

Each of the related one or more rules can "fire" (e.g., become applicable) based on the received data and/or existing population of data. For example, a query to the rules and strategy data base can include a complaint regarding "rough engine performance." The returned rules can include a first rule related to fuel flow that can be fired based on received fuel flow data and/or additional received data related to DUS performance related to fuel flow. As another example, a second rule related to fuel flow can be fired upon a comparison of received fuel flow data with an "aggregated" (e.g., previously stored) population of fuel flow data. Many other rules and/or examples are possible as well.

Based on the received data, rules engine 340 can determine which rule(s) should fire and determine one or more responses associated with the fired rules. One possible response includes a set of one or more sub-strategies for diagnosis and/or repair of DUS 102. Example sub-strategies include recommendations to "replace fuel flow sensor" or "inspect fuel filter." Other example sub-strategies include request(s) that one or more additional tests be performed on DUS 102; e.g., "test battery voltage" or "operate engine at 2500-3000 revolutions per minute (RPMs)." The request(s) for additional test(s) can include instructions (i.e., instructions to a technician, testing parameters, and/or computer-language instructions/commands) for performing the additional test(s) on the DUS.

The one or more responses can include diagnostic data, such as, but not limited to, one or more values of received data, aggregated data, and/or baseline data, one or more comparisons between received data, aggregated data, and/or baseline data, and one or more values and/or comparisons of similar data values in previously-received data, aggregated data, and/or baseline data. Other responses, sub-strategies, diagnostic data, and/or examples are possible as well.

A sub-strategy can be associated with a sub-strategy-success estimate expressed as a percentage (e.g., "Recommendation 2 is 28% likely to succeed"), as a ranked list of sub-strategies (e.g., a higher-ranked sub-strategy would have a better sub-strategy-success estimate than a lower-ranked sub-strategy), as a numerical and/or textual value, (e.g., "Action 1 has a grade of 95, which is an 'A' sub-strategy"), and/or by some other type of expression.

The sub-strategy-success estimate for a given sub-strategy can be adjusted based on feedback, such as the feedback collected by feedback collector 330, for the given sub-strategy. As an example: suppose a response included three sub-strategies: SS1, SS2, and SS3. Further suppose that feedback was received that SS1 was unsuccessful, SS2 was successful, and SS3 was not utilized. In response, the sub-strategy-success estimate for SS1 can be reduced (i.e., treated as unsuccessful), the sub-strategy-success estimate for SS2 can be increased (i.e., treated as successful), and the sub-strategy-success estimate for SS3 can be maintained. Other adjustments based on feedback are possible as well. In some embodiments, sub-strategy-failure estimates can be determined, stored, and/or adjusted instead of (or along with) sub-strategy-success estimates; for example, in these embodiments, sub-strategy-failure estimates can be adjusted downward when corresponding sub-strategies are successfully utilized, and adjusted upward when corresponding sub-strategies are unsuccessfully utilized.

In still other embodiments, one or more given sub-strategies in the set of one or more sub-strategies can be excluded from a DUS report. As one example, a maximum number of sub-strategies MaxSS can be provided and sub-strategies beyond the maximum number of sub-strategies MaxSS could be excluded. The sub-strategies could then be selected based on various criteria; e.g., the first (or last) MaxSS sub-strategies generated by rules engine 340, random selection of MaxSS sub-strategies, based on sub-strategy-success estimates, and/or based on sub-strategy-failure estimates. As another example, sub-strategies whose sub-strategy-success estimate did not exceed a threshold-success-estimate value (or failed to exceed a threshold-failure-estimate value) can be excluded. Combinations of these criteria can be utilized; e.g., select the first MaxSS sub-strategies that exceed the threshold-success-estimate value or select the MaxSS sub-strategies that exceed the threshold-success-estimate value and have the highest sub-strategy-success estimates out of all sub-strategies.

The DUS report can include part or all of the statistical analysis, diagnostic data, and some or all of the sub-strategies of DUS 102. Other information, such as information related to DUS 102 and/or complaint data can be provided with the DUS report.

An example display of a DUS report is shown in TABLE 1 below:

TABLE 1

Service Report for Tuftrux 2008 Model TRK-1234
VIN: XXXXXXXXXXXXXXXXX

Owner: J. Doe
Service Technician: R. Buck, Super Swift Service, Chicago, IL 60606.
Date: Apr. 1, 2011                                                             Mileage: 37,325
Complaint:

Engine Overheats while idling at stop light.

Diagnostic Data Table

| Diagnostic Value | Received Data | Reference Data | Baseline Data |
| --- | --- | --- | --- |
| Coolant Temperature | 240° F. (Apr. 1, 2011) | 190°-220° F. | 200° F. (Aug. 1 2008 |
| Additional data available. | | | |

Analysis:

After operating for 100 seconds at 600-650 RPMs, the engine coolant for this vehicle was at 240 degrees F., which exceeds the reference range. Based on reference data, the engine coolant for this make, model, and year of vehicle, engine coolant should be in the range of 190-220 degrees F. after operating for 100 seconds at 600-650 RPMs. Also, during baseline operation of this vehicle as performed on Aug. 1, 2008, the engine coolant was at 200 degrees F. after operating for 100 seconds at 600-650 RPMs.

Diagnostic Strategy (3 sub-strategies most likely to be successful shown):

1. Add coolant and operate vehicle at idle. Inspect coolant system (radiator, hoses, etc.) for coolant drips/leaks during idle operation. Repair leaking components. Success likelihood: 90%
2. Drain coolant and replace radiator and hoses. Success likelihood: 40%
3. Inspect water pump for damage. If damaged, replace water pump. Success likelihood: 20%
Additional sub-strategies available.

While this example DUS report is shown as a text-only report, additional types of data can be used in the reports described herein (including but not limited to DUS reports) such as, but not limited to visual/graphical/image data, video data, audio data, links and/or other address information (e.g., Uniform Resource Locators (URLs), Uniform Resource Indicators (URIs), Internet Protocol (IP) addresses, Media Access Layer (MAC) addresses, and/or other address information), and/or computer instructions (e.g., HyperText Transfer Protocol (HTTP), eXtended Markup Language (XML), Flash®, Java™, JavaScript™, and/or other computer-language instructions).

Data collector 350 can coordinate testing activities for one or more tests run during a "data collection session" of testing of DUS 102. To carry out a test of a data collection session, data collector 350 can issue "DUS-test requests" or requests for data related to DUS 102 and receive "DUS-test-related data" in response. A DUS-test request can be related to one or more "tests" for DUS 102. In this context, a test of DUS 102 can include performing one or more activities (e.g., repair, diagnostics) at DUS 102, collecting data from DUS 102 (e.g., obtaining data from one or more sensors of DUS 102), and/or receive device-related data for DUS 102 (i.e., receive device-related data via a user interface or via a network-communication interface). The DUS-test-related data for each test run during the data collection session can be combined into "DUS-related data" collected during the entire data collection session. DUS-related data can include data obtained via a data logger operating to collect data during operation of DUS 102.

Some DUS-test requests can be made in accordance with an OBD-II protocol, perhaps via communications using an OBD-II message format. An OBD-II message format can include: start-of-frame and end-of-frame data, a message identifier, an identifier related to remote messaging, an acknowledgment flag, cyclic redundancy check (CRC) data, and OBD-II payload data. The OBD-II payload data can include a control field indicating a number of bytes in an OBD-II payload field, and the OBD-II payload field. The OBD-II payload field can specify an OBD-II mode, an OBD-II parameter ID (PID), and additional payload data. Example OBD-II modes include, but are not limited to, modes to: show current data, show freeze frame data, show one or more frames of previously-recorded data (e.g., movies of OBD-II data), show stored Diagnostic Trouble Codes (DTCs), clear DTCs and stored values, test results for oxygen sensor monitoring, test results for other components, show DTCs detected during current or last driving cycle, control operation of on-board component/system, request vehicle information mode, and a permanent/cleared DTC mode. Example OBD-II PIDs include, but are not limited to, freeze DTC, fuel system status, engine coolant temperature, fuel trim, fuel pressure, engine revolutions/minute (RPMs), vehicle speed, timing advance, and intake air temperature. Many other OBD-II modes and OBD-II PIDs are possible as well.

As data related to the DUS-test requests is collected, data collector 350 can update a data collection display to show progress of data collection and testing. An example data collection display is described in more detail with respect to FIG. 5 below. Completion of data collection can be determined by a rules engine (e.g., rules engine 340 and/or rules engine 440).

Data collector 350 can receive and store test-related data, perhaps in a "DUS profile" associated with DUS 102. The DUS profile can be created, updated, and/or deleted by data collector 350.

Along with the test-related data, the DUS profile can be configured to updated and/or created to store device-related data, complaint data, DUS reports, and/or test-related data taken at various times during the life of the DUS (e.g., baseline data). As such, the data stored in the DUS profile can be a service history of a DUS 102. In some embodiments, data collector 350 can generate a DUS-profile report of the service history.

An example DUS-profile report is shown in Table 2.

TABLE 2

Service Profile for Tuftrux 2008 Model TRK-1234
VIN: XXXXXXXXXXXXXXXXX

Owner: J. Doe
Service Technician: R. Buck, Super Swift Service, Chicago, IL 60606.
Date: Apr. 1, 2011                Mileage: 37,325
Service History Summary 1. Aug. 1, 2008 service:
   Complaint: none
   Action taken: Baseline data gathered.
   Click here for related diagnostic data.
2. Mar. 15, 2000 service
   Complaint: Rough idling
   Action taken: O2 sensor replaced.
   Click here for related diagnostic data.
3. Apr. 1, 2011 service
   Complaint: Overheats while idling at stop light.
   Action taken: Radiator hose inspected and replaced.
   Click here for related diagnostic data.

As indicated above, the DUS-profile report can include a reference to test-related data obtained at various times related to DUS 102. In other embodiments, some or all of the obtained test-related data can be included directly in the DUS-profile report. In still other embodiments, the DUS-profile report does not include references to the test-related data.

Text analyzer 360 can perform a "textual analysis" of the complaint data; that is, text analyzer 360 can parse, or otherwise examine, the complaint data to find key words and/or phrases related to service (i.e., testing, diagnosis, and/or repair) of DUS 102. For example, suppose the complaint data included a statement that "My car is running roughly at idle, but runs smoothly while cruising." The complaint data can be parsed for key words/phrases such as "running roughly," "idle", "runs smoothly" and "cruising" to request one or more tests of overall engine performance (e.g., based on the terms "running roughly" and "runs smoothly") at both an "idle" condition and a "cruising" condition. Many other examples of key words/phrases, complaint data, parsing/examination of complaint data, and/or test requests are possible as well.

In some embodiments, the complaint can be specified using a "complaint code." For example, a complaint can be specified as an alphanumeric code could be used; e.g., Code E0001 represents a general engine failure, code E0002 represents a rough idling engine, etc. In these embodiments, the complaint data can include the complaint code. In some of the embodiments, text analyzer 360 can generate one or more complaint codes as a result of textual analysis of the complaint.

Data analyzer 370 can analyze data related to DUS 102. In particular, data analyzer can generate a "statistical analysis" comparing received data related to DUS 102 and an existing population of data. The existing population of data can include, but is not limited to, aggregated data, reference data, and/or stored data related to DUS 102. Reference data can include data from a manufacturer, component supplier, and/or other sources indicating expected values of data for DUS 102 when DUS 102 is operating normally. Stored data related to DUS 102 can include data for device-under-test 102 captured and stored at time(s) prior to receiving the received data. This stored data can include baseline data for DUS 102. The baseline data can then be stored, and perhaps used for comparisons with data taken during operation related to a complaint (e.g., test-related data accompanying with complaint data). In some embodiments, aggregated data can include some or all of the reference data and stored data related to DUS 102. As such, the aggregated data can be treated as the existing population of data.

The statistical analysis can include matching received data with a subset of the existing population of data, such as by matching received data for a given DUS with an existing population of data for device(s) sharing the same core-device information (e.g., year, model, make, ECU information) with the given DUS. Many other types of subset matching of the existing population of data are possible as well, such as use of other information than the core-device information, narrowing a subset of data, and/or expanding a subset of data.

An example of narrowing the subset of data includes filtering the subset of data for a particular release of the ECU. Example expansions of the subset of data include: adding similar models of vehicles sharing core-device information, adding earlier and/or later years of data, and/or adding data of different makes known to be manufactured by a common manufacturer. Many other examples of subset matching, narrowing subsets of data, and expanding subsets of data are possible as well.

The statistical analysis can include indications of matching values between the received data and the existing population of data, range(s) of values of the existing population of data and a comparison of received data relative to the range (e.g., determine coolant temperature for the existing population of data is between 155 F.° and 175 F.° and the received coolant temperature of 160 F.° is within this range), and/or determine statistics for the received data and/or the existing population of data (e.g., mean, median, mode, variance, and/or standard deviation). The statistical analysis can include analysis of data from one or more sensors and/or one or more types of data (e.g., analysis of both fuel trim and fuel pressure data).

The statistical analysis can include comparisons of data received from DUS 102 over time. For example, the received data can be compared with baseline data for DUS 102 to generate the statistical analysis and/or a differential analysis between the baseline data and the received data. In generating the statistical analysis and/or differential analysis, data analyzer 370 can use one or more of the techniques for classifying test-related data as discussed below in the context of FIG. 4. For example, data analyzer 370 can classify one or more data values as baseline data.

Additionally or instead, received data generated within a testing interval of time (e.g., the received data includes a number of data samples that are collected at various times during the testing interval of time) can be statistically analyzed; for example, to determine statistics within the testing interval, to remove or determine outlying data points, and/or for other types of statistical analysis. In some embodiments, reference data and/or aggregated data can be used as baseline data. In still other embodiments, data in the existing population of data can be statistically analyzed within testing intervals of time.

Data storage interface 380 is configured to store and/or retrieve data and/or instructions utilized by client device 104. An example data storage interface 380 is data storage 216, described above in the context of FIG. 2.

Figure 4:
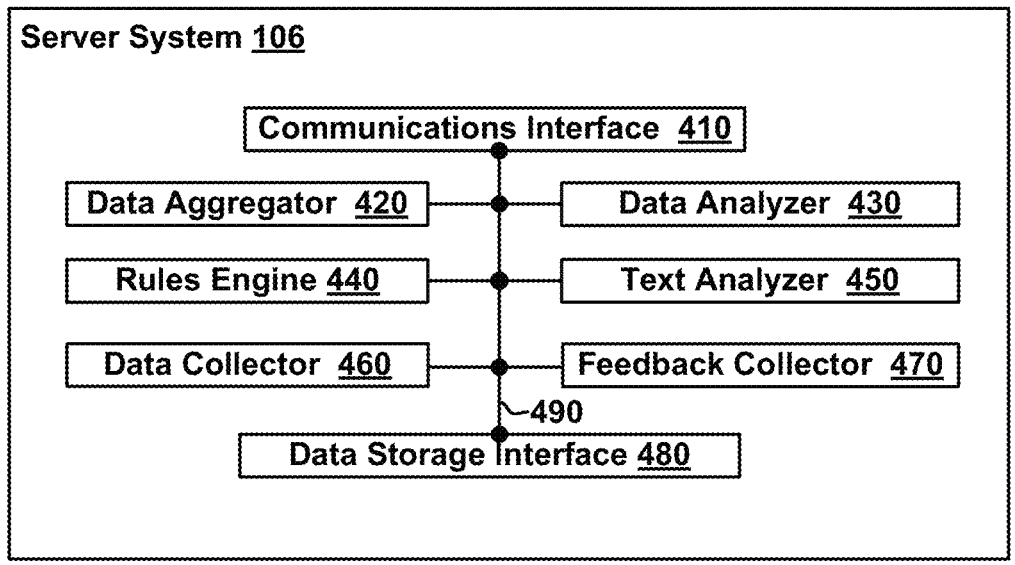
FIG. 4 is a block diagram of an example server device.

FIG. 4 is a block diagram of an example server device 106. Server device 106 can include communications interface 410, data aggregator 420, data analyzer 430, rules engine 440, text analyzer 450, data collector 460, feedback collector 470, and data storage interface 480, all connected via interconnect 490.

The arrangement of components of server device 106 as shown in FIG. 4 is an example arrangement. In other embodiments, server device 106 can utilize more or fewer components than shown in FIG. 4 to perform the herein-described functionality of server device 106.

Communications interface 410 is configured to enable communications between server device 106 and other devices. An example communication interface 410 is network-communication interface 212, described above in the context of FIG. 2.

Data aggregator 420 can create, update, and/or delete a DUS profile associated with DUS 102 and perhaps generate a related DUS-profile report using the techniques described above with respect to FIG. 3. Thus, client device 104 and/or server device 106 can maintain DUS profile(s) and generate DUS-profile report(s).

Data aggregator 420 can classify data based on a complaint. For example, all test-related data related to complaints about DUSs failing to start can be classified as data related to "failing to start" complaints. Upon aggregation into a set of data sharing a common classification, a portion of the data can be retained as aggregated data. For example, data in the "failing to start" classification related to starters, batteries, and electrical systems could be aggregated. Other data can be aggregated as well, aggregated into another classification, and/or discarded. For example, data likely to be unrelated to a complaint can be reclassified and aggregated based on the reclassification. In this context, data related to tire pressures conveyed as part of "failing to start" test-related data could be reclassified as "tire pressure data" and so aggregated. Many other types of aggregation based on complaint-oriented classifications are possible as well.

Data aggregator 420 can classify test-related data based on reliability. Classifying test-related data for reliability can include comparing data values of test-related data with reference values and/or baseline data. Some example techniques for comparing data values with reference values/baseline data are to determine that:

a data value is the same as one or more reference/baseline values (e.g., a tire pressure reading TPR is 32 pounds per square inch (PSI); a manufacturer name is "Tuftrux"), the data value is within a range of data values (e.g., TPR is between 28 and 34 PSI), the data value is above and/or below a threshold value of a reference/baseline value (e.g., TPR is in the range of 31±t PSI, where t=the threshold/baseline value), the data value begins with, ends with, or contains the reference/baseline value (e.g., a vehicle identification number (VIN) begins with a "1" or contains the string of characters "1GT"), each of a number of data values is the same, within a range, and/or within a threshold of a reference/baseline value (e.g., tire pressure readings for four tires are all within 28-34 PSI), computation(s) on the data value(s), perhaps including reference and/or baseline values, are calculated and perhaps compared to the reference and/or baseline values (e.g., take an average value of a number of data values, convert English-measure data values to metric-unit equivalents and compare the converted values to metric-unit reference values, use data values in a formula and compare the result of the formula with reference values), and/or negations of these conditions (e.g., a temperature is not within the range of 110-130° F.).

Many other techniques for determining data values are reliable based on reference and/or baseline data are possible as well.

Reference and/or baseline data can include predetermined values (e.g., 28 PSI), ranges (e.g., 28-34 PSI), thresholds (e.g., a 3 PSI threshold), formulas (e.g., C=1.8*F), and/or matching patterns (e.g., "1*2" as a pattern matching a string that begins with a "1" and ends with a "2").

Reference and/or baseline data can also be based on data values previously-classified as reliable. For example, suppose three devices had respective temperature readings of 98, 99, and 103 degrees, and that all three temperature readings were reliable. Then, the average A of these three values (100 degrees) and/or range R of these three values (5 degrees) can be used as reference values: e.g., a temperature data value can be compared to A, A+R, A−R, A±R, A±cR, for a constant value c, c1A±c2R for constant values c1, c2). Many other bases for use of reliable data values as reference and/or baseline data are possible as well.

Reference and/or baseline data can be based on a statistical screening of data. The statistical screening can involve generating one or more statistics for data to be aggregated into reference and/or baseline data and then aggregating the data based on the generated statistics.

For example, suppose test-related data included a measurement value of Meas1 taken using a sensor Sens1. Further suppose that aggregated data related to the measurement value from sensor Sens1 indicated a mean measurement value of MeanMeas1 with a standard deviation of SDMeas1. Then, a number of standard deviations NSD from the mean MeanMeas1 for Meas1 could be determined, perhaps using the formula $$NSD = \frac{|MeanMeas1 - Meas1|}{SDMeas1}.$$

Then, the measurement value Meas1 could be aggregated into the aggregated data related to sensor Sens1 when the number of standard deviations NSD is less than or equal to a threshold number of standard deviations NSD_Threshold. For example, if NSD_Threshold=2, then Meas1 would be aggregated into aggregated data if Meas1 were within 2 standard deviations of the mean MeanMeas1.

In some embodiments, statistical screening for a set of data values can be performed only if a predetermined number of data values N have been aggregated into the set of data values. In these embodiments, if the number of aggregated data values is less than N then data values can be aggregated without statistical screening until at least N data values have been aggregated. In some embodiments, N can be large enough to gather data without screening for a considerable period of time (e.g., one or more months). Then, after the considerable amount of time, screening can be performed, thus permitting data gathering during the considerable amount of time without focusing on average good or failed values.

Many other types of statistical screening are possible as well.

Data aggregator 420 can classify test-related data in connection with rules engine 440. In some embodiments, rules engine 440 can instruct data aggregator 420 to use one or more techniques for classifying one or more data values in the test-related data. In other embodiments, data aggregator 420 can communicate some or all of the test-related data and/or some or all of the baseline values to rules engine 440, rules engine 440 can classify of the test-related data and subsequently communicate a classification of the test-related data to data aggregator 420. In some of these other embodiments, data aggregator 420 can perform a preliminary classification for test-related data; and upon a preliminary classification that the test-related data is reliable, communicate some or all of the test-related data and/or some or all of the baseline values to rules engine 440 for a final determination of reliability. Finally-determined-reliable data can then be added to baseline data, as described above. In still other embodiments, data aggregator 420 can determine test-related data is reliable without communicating with rules engine 440.

Such classified data values and/or reference data can be combined or aggregated into aggregated data by data aggregator 420. The aggregated data can be updated over time; for example, classified data values can be added or otherwise combined with the aggregated data based on a classification of the data values. In some embodiments, aggregated data can include data values that have not been classified; e.g., total populations of data, or all data for a specific DUS. The aggregated data can be stored, perhaps in a database, and later retrieved and used for classifications and/or for other purposes.

Data analyzer 430 can analyze data related to DUS 102, such as described above for data analyzer 370 in the context of FIG. 3.

Rules engine 440 can receive data, perhaps including complaint data, analyze the received data, and generate corresponding DUS reports, such as described above for rules engine 340 in the context of FIG. 3.

Text analyzer 450 can parse, or otherwise examine, complaint data to find key words and/or phrases related to service of DUS 102, such as described above for text analyzer 360 in the context of FIG. 3.

Data collector 460 can coordinate testing activities for one or more tests run during a data collection session of testing of DUS 102, such as described above for data collector 450 in the context of FIG. 3.

Feedback collector 470 is configured to request, receive, store, and/or retrieve "feedback" or input on reports and/or sub-strategies, such as described above for feedback collector 330 in the context of FIG. 3.

Data storage interface 480 is configured to store and/or retrieve data and/or instructions utilized by server device 106. An example of data storage interface 460 is data storage 216, described above in the context of FIG. 2.

Figure 5:
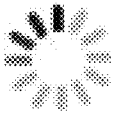
FIG. 5 depicts an example data collection display.

FIG. 5 depicts an example data collection display 500, including DUS identification 510, overall status bar 520, detailed diagnostic status 530, and test status bars 540, 542, 544, and 546.

DUS identification 510 can include device-related data that specifies a DUS. Overall status bar 520 can visually, numerically, and/or textually show the status of a data collection session. As shown in FIG. 5, overall status bar 520 graphically, textually and numerically shows percentage completion of the data collection session; in this example, the data collection session is 63% complete.

Detailed diagnostic status 530 can provide additional progress information about the data collection session, such as but not limited to, communication status (e.g., the "Communication Established" and "Communicating" indicators shown in FIG. 5), data input status (e.g., the "Complaint Captured" indicator shown in FIG. 5), test-related-data capture status (e.g., the "Checking Codes", "Monitors", and "Collecting Data" indicators shown in FIG. 5), and analysis status (e.g., the "Analyzing Data" indicator shown in FIG. 5).

Test status bars 540, 542, 544, and 546 can provide status of one or more tests conducted during a data collection session. As shown in FIG. 5, test status bars 540, 542, 544, and 546 graphically, textually and numerically each respectively show the percentage completion of a test; for example, test status bar 540 of FIG. 5 shows the "Cranking Test" is 80% complete.

In some embodiments, data collection display 500 can be enhanced with use of audible instructions and/or tones. For example, a tone and/or audible instruction can be used to inform a vehicle technician to change operating state and/or perform another test of a device-under-service; e.g., a tone or instruction to "Please increase acceleration to operate the vehicle at 2500 RPMs now." As another example, a tone and/or audible instruction can be used to inform that operation is out of expected ranges; e.g., for a 2500 RPM test, a tone and/or audible instruction can instruct the technician to increase acceleration when the RPMs rate is under the desired 2500 RPM rate. Additionally, text corresponding to such audible instructions can be displayed on data collection display 500.

III. Example Communications

A variety of communications may be carried out via network 110. Examples of those communications are illustrated in FIGS. 6A, 6B, 6C, 6D, 7A, 7B, and 7C. The communications shown in FIGS. 6A, 6B, 6C, 6D, 7A, 7B, and 7C can be in the form of messages, signals, packets, protocol data units (PDUs), frames, fragments and/or any other suitable type of communication configured to be communicated between devices.

Figure 6A:
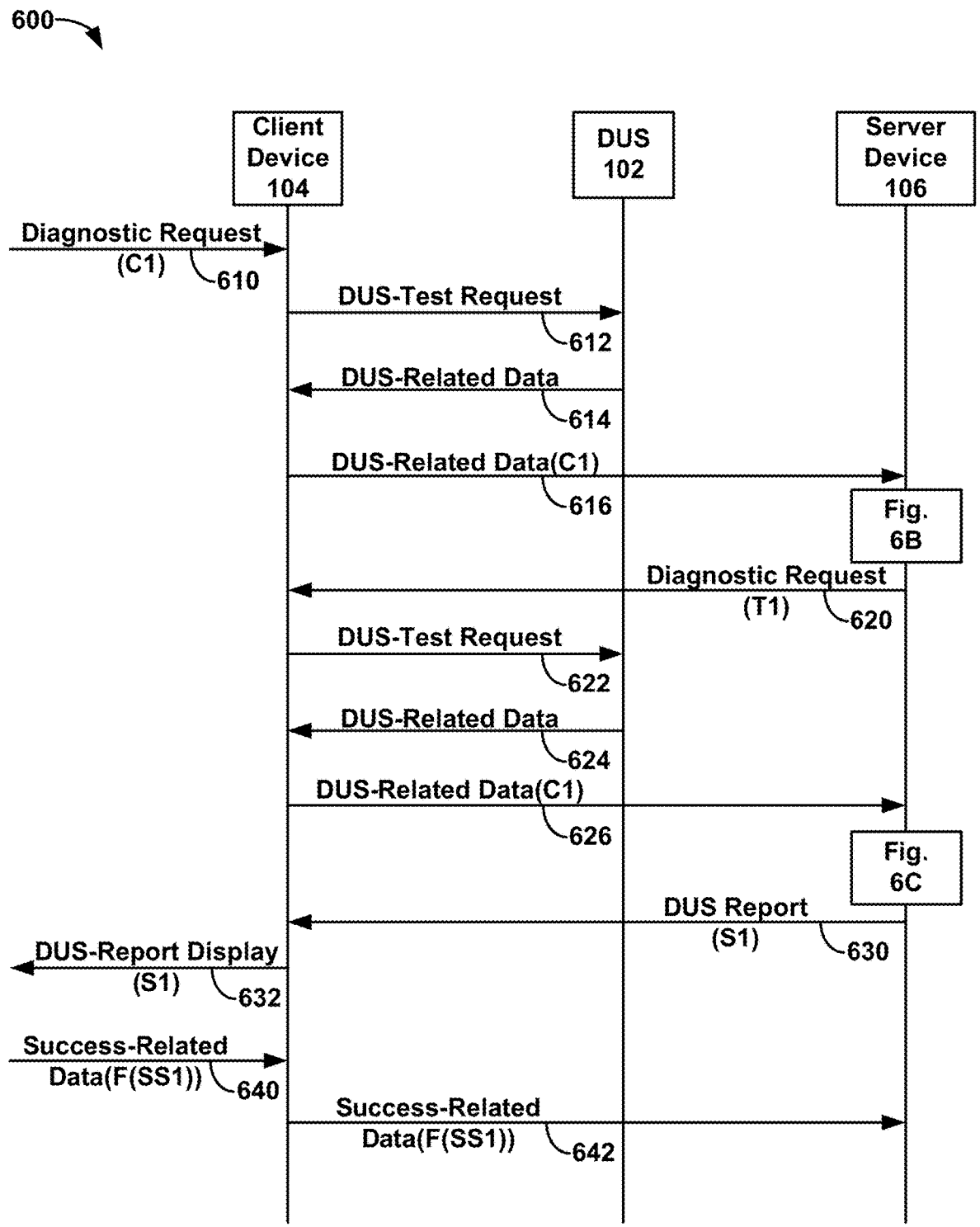
FIG. 6A shows an example scenario for processing a diagnostic request, responsively generating a DUS-report display, and receiving success-related data.

FIG. 6A shows an example scenario 600 for processing diagnostic request 610, responsively generating DUS-report display 632, and receiving success-related data 640. Scenario 600 begins with diagnostic request 610 being received at client device 104. Client device 104 inspects diagnostic request 610 to determine one or more tests related to DUS 102 and responsively generates DUS-test request 612 for performing the one or more tests and communicates DUS-test request 612 to DUS 102. In some embodiments, data collector 350 of client device 104 generates DUS-test request 612. In some embodiments, DUS-test request 612 is formatted in accordance with an OBD-II protocol.

Client device 104 also inspects diagnostic request 610 for a complaint (shown in FIG. 6A as "C1" with diagnostic request 610). In some embodiments, complaint C1 is not further inspected at client device 104; while in other embodiments, text analyzer 360 can perform a textual analysis of complaint C1. Complaint C1 can be provided by a user as text and/or as a complaint code, as mentioned above.

Upon reception of DUS-test request 612 at DUS 102, the one or more tests are performed. Data resulting from the one or more tests is gathered and communicated from DUS 102 to client device 104 as DUS-related data 614. Client device 104 then communicates DUS-related data and complaint C1 to server device 106 using DUS-related data 616.

FIG. 6A shows that in response to DUS-related data 616, server device generates diagnostic request 620 with a request for one or more additional tests (depicted as T1). Details of generation of diagnostic request 620 are described below with respect to FIG. 6B.

Upon reception of diagnostic request 620, client device 104 communicates DUS-test request 622 to carry out the additional tests T1. Upon reception of DUS-test request 622 at DUS 102, the one or more additional tests T1 are performed. Data from the one or more additional tests is gathered and communicated from DUS 102 to client device 104 as DUS-related data 624. Client device 104 then communicates DUS-related data and complaint C1 to server device 106 using DUS-related data 626. In some scenarios not shown in FIG. 6A, DUS-related data 626 does not include complaint C1 as C1 had already been communicated to server device 106 (via DUS-related data 616) and so C1 could be stored by server device 106.

FIG. 6A shows that in response to DUS-related data 626, server device 106 generates DUS report 630 with strategy S1 and communicates DUS report 630 to client device 630. In some embodiments, strategy S1 includes one or more sub-strategies SS1, SS2, etc. to address complaint C1. Sub-strategies to address complaints are discussed above in more detail with respect to FIG. 3. Details of the generation of DUS report 630 are described below with respect to FIG. 6C.

In response to receiving DUS report 630, client device 104 generates and communicates DUS-report display 632. An example DUS-report display is shown in Table 1 above. After communicating DUS-report display 632, scenario 600 continues with client device 104 receiving success-related data 640. FIG. 6A shows success-related data 640 with F(SS1), which is feedback F for sub-strategy SS1 of strategy S1. Feedback on sub-strategies is discussed above in more detail with respect to FIG. 3. In response to success-related data 640, client device 104 communicates corresponding success-related data 642 with F(SS1) to server device 106.

In some scenarios not shown in FIG. 6A, server device 106 can send a DUS-report in response to DUS-related data 616 (i.e., server device 106 does not request additional tests/data). In other scenarios not shown in FIG. 6A, server device 106 can send two or more diagnostic requests to request more additional test(s). In other scenarios not shown in FIG. 6A, client device 104 can receive and analyze DUS-related data 616 and 626 to generate DUS report 630, such as described below in more detail with respect to FIGS. 7A, 7B, and 7C. That is, client device 104 can perform some or all of the functionality described herein with respect to server device 106 in scenarios 600, 650, and/or 680. In still other scenarios not shown in FIG. 6A, no success-related data is received in response to DUS-report display 632 (i.e., no feedback on strategy S1 is provided to client device 104 and/or server device 106).

Figure 6B:
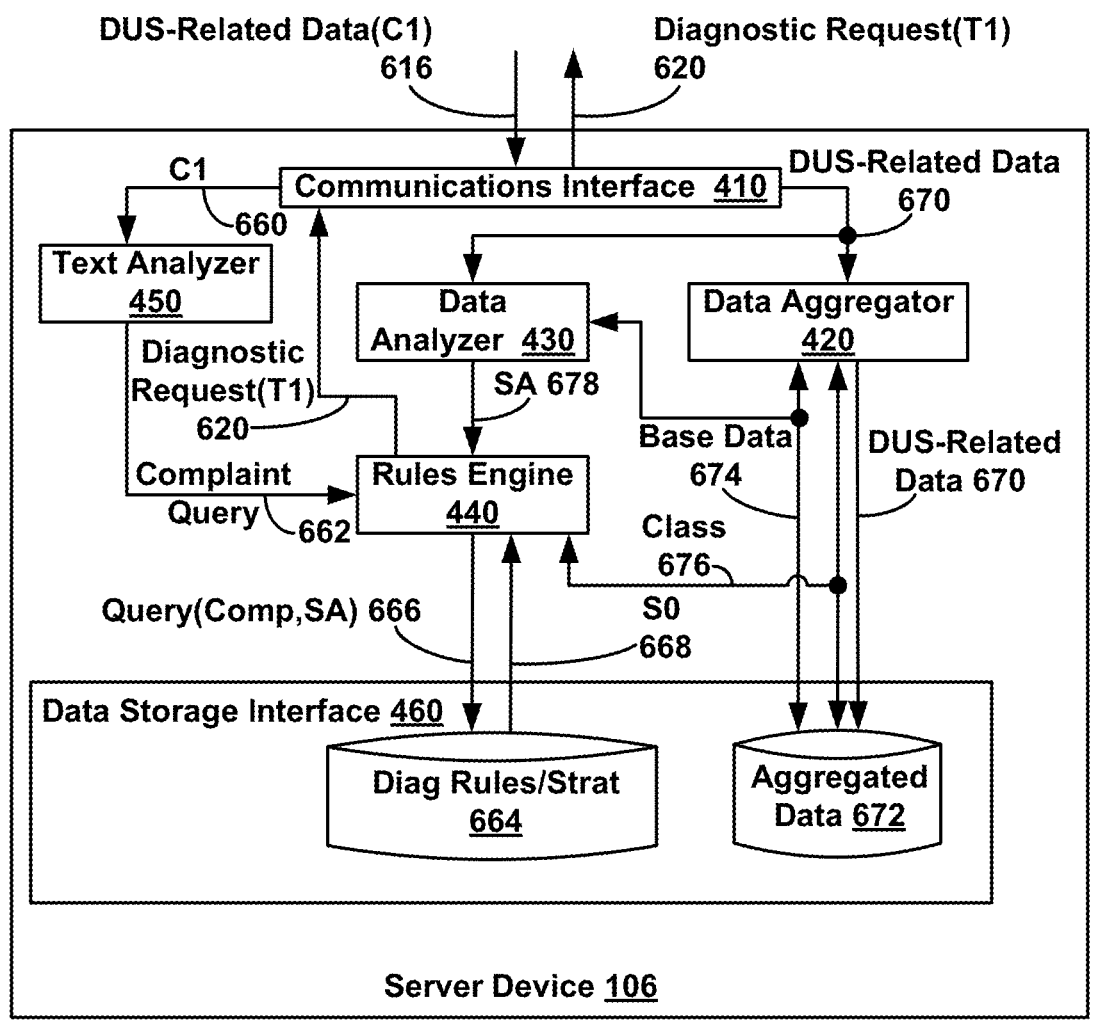
FIG. 6B shows an example scenario for processing DUS-related data and responsively generating a diagnostic request.

FIG. 6B shows an example scenario 650 for processing DUS-related data 616 and responsively generating diagnostic request 620. DUS-related data with complaint C1 616 is received at communications interface 410 of server device 106. FIG. 6B shows that complaint query 662 is generated by text analyzer 450 in response to complaint C1 660. Complaint query 662 can include key words/phrases as determined based on textual analysis of complaint C1, such as described above with respect to FIG. 3.

DUS-related data 670 is communicated from communications interface 410 to both data aggregator 420 and data analyzer 430. FIG. 6B shows that complaint C1 is not included with DUS-related data 670; but in some embodiments not shown in FIG. 6B, DUS-related data 670 includes C1 (i.e., is a copy of as DUS-related data 616).

Upon reception of DUS-related data 670, data aggregator 420 and/or rules engine 440 can classify DUS-related data using the techniques described above in the context of FIG. 4. As part of the classification, data aggregator 420 can query or otherwise access aggregated data 672 to determine baseline data 674 (shown in FIG. 6B as "Base Data 674") for DUS-related data 670. Upon classifying DUS-related data 670, classification 676 (shown in FIG. 6B as "Class 676") can be generated by data aggregator 420 and/or rules engine 440. Once generated, classification 676 can be communicated to rules engine 440. Additionally, DUS-related data 670 can be stored, perhaps according to and/or along with classification 670, by data aggregator 420 in aggregated data 672.

Upon reception of DUS-related data 670, data analyzer 430 can generate statistical analysis (SA) 678 of DUS-related data 670, perhaps based on baseline data 674, using the techniques described above in the context of FIGS. 3 and 4. Data analyzer 430 can communicate statistical analysis 678 to rules engine 440.

Upon reception of complaint query 662, classification 676, and statistical analysis 672, rules engine 440 can communicate query 666 with complaint data (shown in FIG. 6B as "Comp") and statistical analysis SA to diagnostic rules and strategy data base 664 (shown in FIG. 6B as "Diag Rules/Strat 664") using the techniques described above in the context of FIGS. 3 and 4. In response, diagnostic rules and strategy data base 664 can communicate strategy 668 (shown in FIG. 6B as "S0") including one or more rules and associated sub-strategies to rules engine 440. Using the techniques described above in the context of FIGS. 3 and 4, rules engine 440 can determine which rule(s) of strategy 668 fire, and so determine the fired rule(s)' associated sub-strategy/sub-strategies. In scenario 650, rules engine 640 determines that additional data is required, based on the fired rule(s) and associated sub-strategy/sub-strategies. Rules engine 640 can generate diagnostic request 620 to execute test(s) T1 to obtain the additional data and communicate diagnostic request 620 to communications interface 410. Communications interface 410 can then send diagnostic request 620.

Figure 6C:
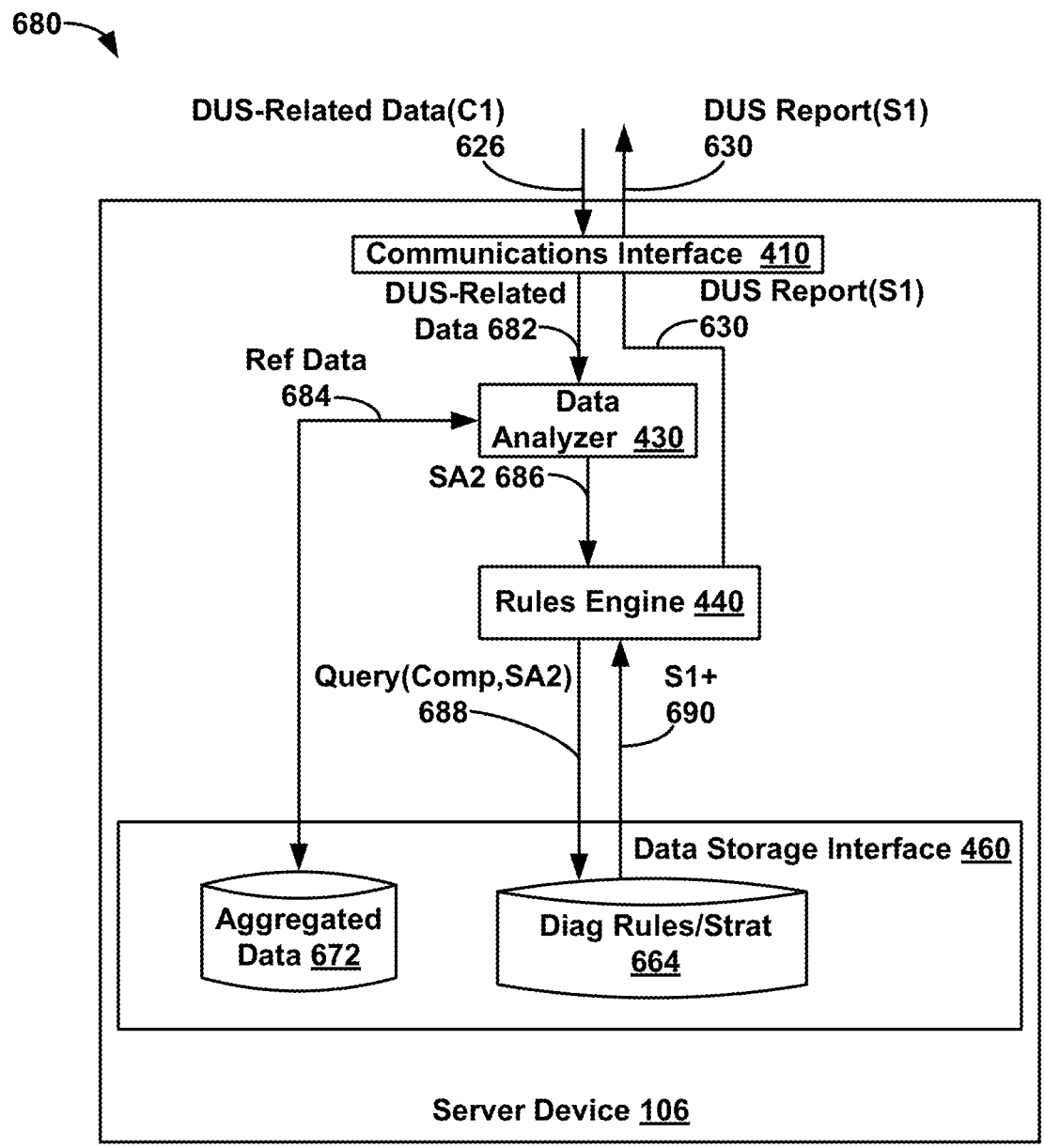
FIG. 6C shows an example scenario for processing DUS-related data and responsively generating a DUS-report.

FIG. 6C shows an example scenario 680 for processing DUS-related data 626 and responsively generating DUS-report 630. DUS-related data with complaint C1 626 is received at communications interface 410 of server device 106. In scenarios not shown in FIG. 6C, complaint C1 can be analyzed by a text analyzer to determine a complaint query. Rather, scenario 680 assumes C1 has already been analyzed by a text analyzer, such as described above with respect to FIGS. 3 and 6B.

DUS-related data 682 is communicated from communications interface 410 to data analyzer 430. In scenarios not shown in FIG. 6C, DUS-related data 626 is provided to a data aggregator to possibly be combined with aggregated data, such as described above in FIGS. 4 and 6B. FIG. 6C shows that complaint C1 is not included with DUS-related data 682; but in some embodiments not shown in FIG. 6C, DUS-related data 682 includes C1 (i.e., is a copy of DUS-related data 626).

Upon reception of DUS-related data 682, data analyzer 430 can generate statistical analysis 686 (shown in FIG. 6C as "SA2") of DUS-related data 682, using the techniques described above in the context of FIGS. 3, 4, and 6B. Data analyzer 430 can communicate statistical analysis 2 686 to rules engine 440.

Upon reception of statistical analysis 686, rules engine 440 can communicate query 688 with previously-determined complaint data (shown in FIG. 6C as "Comp") and statistical analysis 686 to diagnostic rules and strategy data base 664 (shown in FIG. 6C as "Diag Rules/Strat 664") using the techniques described above in the context of FIGS. 3 and 4. In response, diagnostic rules and strategy data base 664 can communicate strategy 690 (shown in FIG. 6B as "S1+") including one or more rules and associated sub-strategy/sub-strategies to rules engine 440. Using the techniques described above in the context of FIGS. 3 and 4, rules engine 440 can determine which rule(s) should fire and their associated sub-strategy/sub-strategies. In scenario 680, rules engine 640 generates DUS report 630 that can include some or all of statistical analysis 686 and/or some or all of the sub-strategies of strategy 690 (collectively shown in FIG. 6C as "S1") and communicates DUS report 630 to communication interface 410. Communications interface 410 can then send DUS report 630.

Figure 6D:
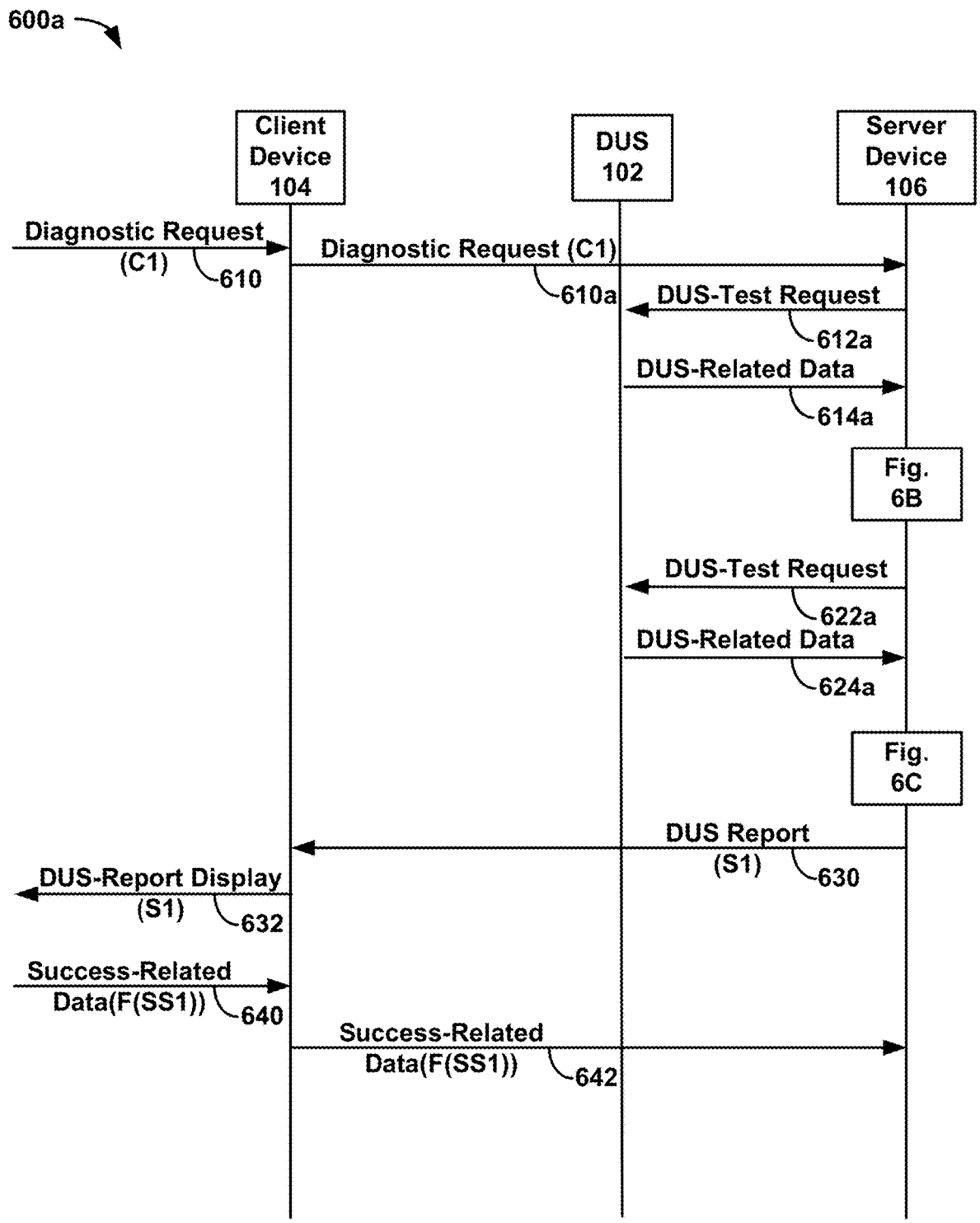
FIG. 6D shows another example scenario for processing DUS-related data and responsively generating a DUS-report.

FIG. 6D shows another example scenario 600*a* for processing diagnostic request 610, responsively generating DUS-report display 632, and receiving success-related data 640. Scenario 600*a* is an alternative to scenario 600 where server device 106 directs testing of DUS 102, rather than client device 104.

Scenario 600*a* begins with diagnostic request 610 being received at client device 104. Client device 104 forwards diagnostic request 610 as diagnostic request 610*a* to server device 106. Server device 106 can examine diagnostic request 610*a* to determine one or more tests related to DUS 102 and responsively generates DUS-test request 612 for performing the one or more tests and communicates DUS-test request 612 to DUS 102.

Server device 106 can inspect diagnostic request 610 for a complaint (shown in FIG. 6C as "C1" with diagnostic request 610*a*). In some embodiments, complaint C1 is not further inspected at server device 106; while in other embodiments, text analyzer 450 can perform a textual analysis of complaint C1. Complaint C1 can be provided by a user as text and/or as a complaint code, as mentioned above.

Upon reception of DUS-test request 612*a* at DUS 102, the one or more tests are performed. Data resulting from the one or more tests is gathered and communicated from DUS 102 to server device 106 as DUS-related data 614*a*.

FIG. 6D shows that in response to DUS-related data 614*a*, server device 106 generates DUS-test request 622*a* to carry out one or more additional tests (depicted as T1). Server device 106 generates DUS-test request 622*a* using similar techniques to the techniques described in FIG. 6B for generation of diagnostic request 620.

Upon reception of DUS-test request 622*a* at DUS 102, the one or more additional tests T1 are performed. Data from the one or more additional tests is gathered and communicated from DUS 102 to server device 106 as DUS-related data 624*a*.

FIG. 6D shows that in response to DUS-related data 624*a*, server device 106 generates DUS report 630 with strategy S1 and communicates DUS report 630 to client device 630. Details of the generation of DUS report 630 are described above with respect to FIG. 6C.

The remainder of scenario 600*a* regarding DUS-report display 632, success-related data 640, and success-related data 642 with F(SS1), is the same as discussed above for scenario 600 in the context of FIG. 6A.

In some scenarios not shown in FIG. 6D, server device 106 can send a DUS-report in response to DUS-related data 614*a* (i.e., server device 106 does not request additional tests/data). In other scenarios not shown in FIG. 6D, server device 106 can send two or more DUS-Test requests to request additional test(s). In still other scenarios not shown in FIG. 6D, no success-related data is received in response to DUS-report display 632 (i.e., no feedback on strategy S1 is provided to client device 104 and/or server device 106).

Figure 7A:
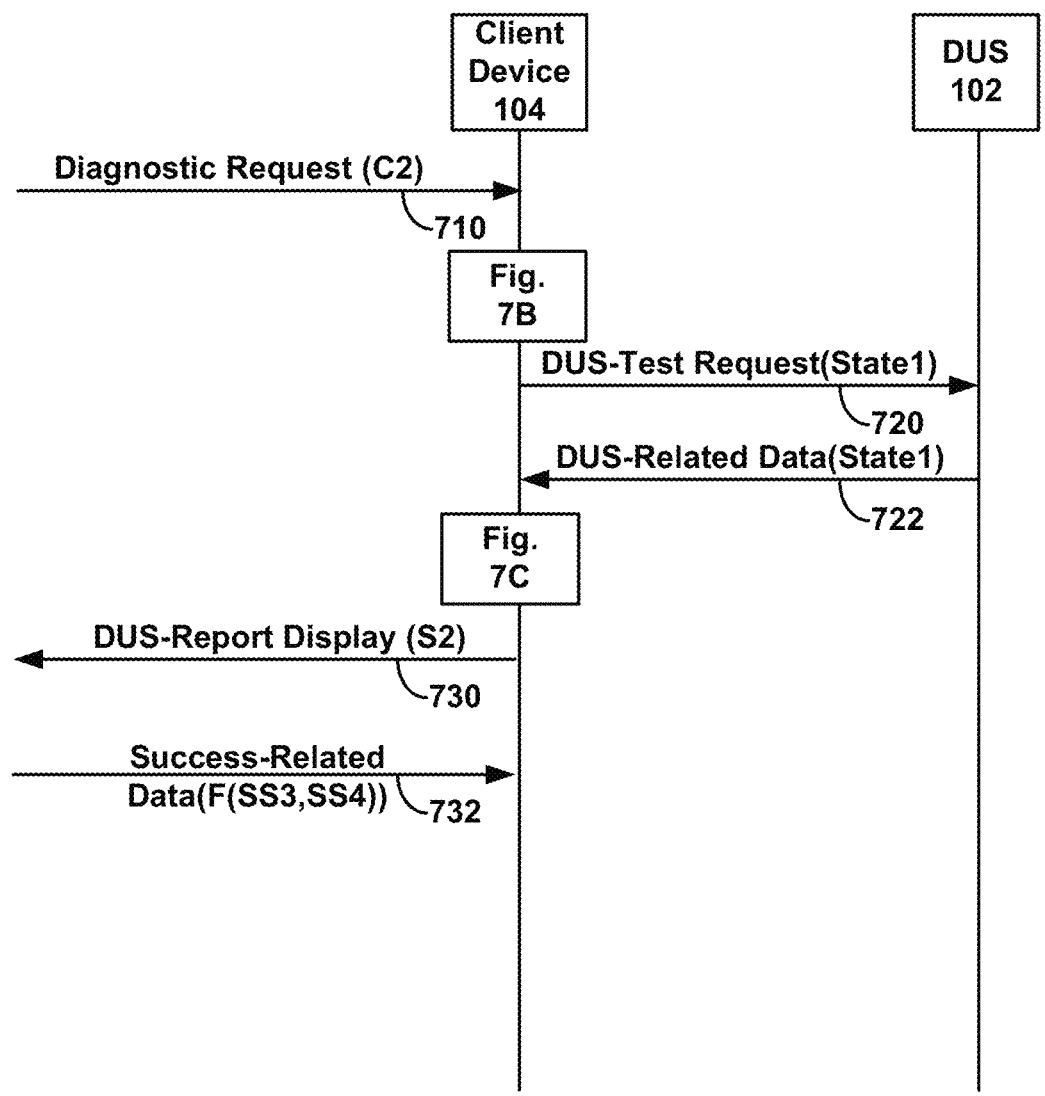
FIG. 7A shows an example scenario for processing a diagnostic request, responsively generating a DUS-report display, and receiving success-related data.

FIG. 7A shows an example scenario 700 for processing diagnostic request 710, responsively generating DUS-report display 730, and receiving success-related data for the DUS-report display 732 at client device 104. In some embodiments not shown in FIG. 7A, some or all of the techniques and communications involving client device 104 can be performed by server device 106.

Client device 104 can determine one or more tests related to DUS 102 based on received diagnostic request 710 and responsively generate DUS-test request 720 to DUS 102 for performing the one or more tests. In some embodiments, data collector 350 generates DUS-test request 720. In some embodiments, DUS-test request 720 is formatted in accordance with an OBD-II protocol.

The test(s) in DUS-test request 720 relate to a first operating state (shown as "State1" in FIG. 7A) of DUS 102. Example operating states of DUS 102 include a no-load/lightly-loaded operating state (e.g., an "idle" operating state), various operating states under normal loads (e.g., a "cruising" operating state, a "cranking" operating state), and operating states at or near maximum load (e.g., a "high-speed" operating state). Other operating states are possible as well.

Client device 104 can inspect diagnostic request 710 for a complaint (shown in FIG. 7A as "C2" with diagnostic request 710). Complaint C2 can be provided by a user as text and/or as a complaint code, as mentioned above. In scenario 700, client device 104 (e.g., text analyzer 360) can perform a textual analysis of complaint C2.

Upon reception of DUS-test request 720 at DUS 102, the one or more tests associated with first operating state State1 are performed. Data from the one or more tests are gathered and communicated to client device 104 as DUS-related data 722.

In scenarios not shown in FIG. 7A, one or more additional sequences of DUS-test requests and DUS-related data can be communicated between client device 104 and DUS 102; for example, to communicate additional data required while DUS 102 is operating in either first operating state State1 or to communicate data while DUS 102 is operating in other operating state(s) than first operating state State1.

FIG. 7A shows that, in response to receiving DUS-related data 722, client device 104 generates and communicates DUS-report display 730 related to a strategy S2. An example DUS-report display is shown above in Table 1. After communicating DUS-report display 730, scenario 700 continues with client device 104 receiving success-related data 732. FIG. 6A shows success-related data 730 with F(SS3, SS4), which is feedback F for sub-strategies SS3 and SS4 of strategy S2. Feedback on sub-strategies is discussed above in more detail with respect to FIG. 3 and FIG. 6A. In other scenarios not shown in FIG. 7A, no success-related data is received in response to DUS-report display 730 (i.e., no feedback on strategy S2 is provided to client device 104).

Figure 7B:
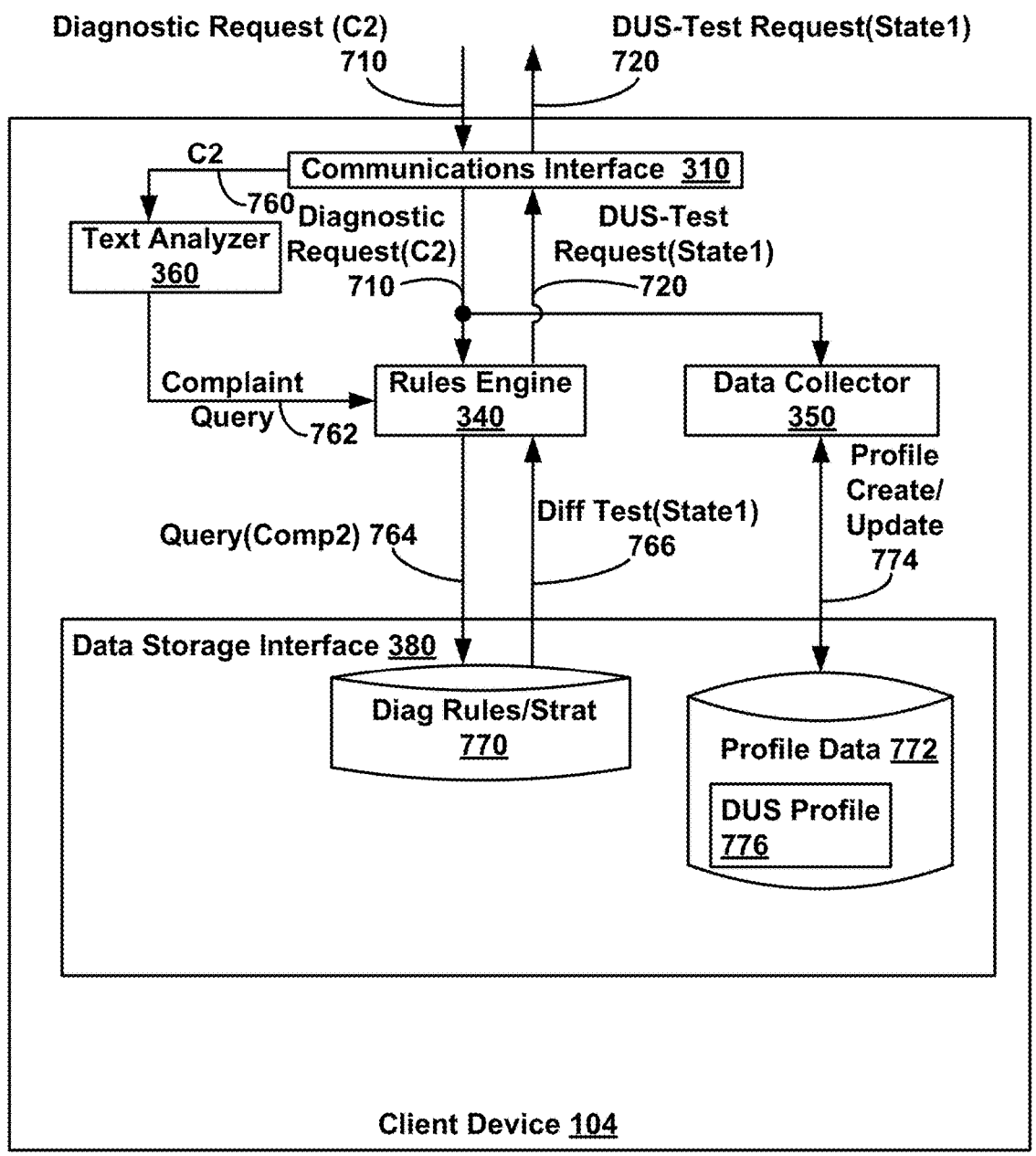
FIG. 7B shows an example scenario for processing a diagnostic request and responsively generating a DUS-test request.

FIG. 7B shows an example scenario 750 for processing diagnostic request 710 and responsively generating DUS-test request 720. Diagnostic request with complaint C2 710 is received at communications interface 310 of client device 104. FIG. 7B shows that, complaint query 762 is generated by text analyzer 360 in response to complaint C2 760. Complaint query 762 can include key words/phrases as determined based on textual analysis of complaint C2, such as described above with respect to FIGS. 3 and 6B.

Diagnostic request 710 is communicated from communications interface 310 to both rules engine 340 and data collector 350. FIG. 6B shows that complaint C2 is included with diagnostic request 710; but in some embodiments not shown in FIG. 7B, a diagnostic request without complaint C2 can be provided to rules engine 340 and/or data collector 350.

Upon reception of complaint query 762 and diagnostic request 710, rules engine 340 can communicate query 764 with complaint data (shown in FIG. 7B as "Comp2") to diagnostic rules and strategy data base 770 (shown in FIG. 7B as "Diag Rules/Strat 770") using the techniques described above in the context of FIGS. 3, 4, and 6B. In response, diagnostic rules and strategy data base 770 can communicate differential test request 766 related to an operating states of DUS 102, shown in FIG. 7B as "State1." Rules engine 640 can generate DUS-test request 720 to execute test(s) to obtain data related to first operating state State1 and communicate DUS-test request 720 to communications interface 310. Communications interface 310 can then send DUS-test request 720.

Upon reception of diagnostic request 710, data collector 350 can create or update DUS profile 776, using the techniques described above in the context of FIG. 3. DUS profile 776 can be stored in a database of DUS profiles, such as profile data 772 shown in FIG. 7B. Profile data 772 can be queried to create, update, and retrieve DUS profiles based on profile-related criteria such as described above in the context of FIG. 3.

Figure 7C:
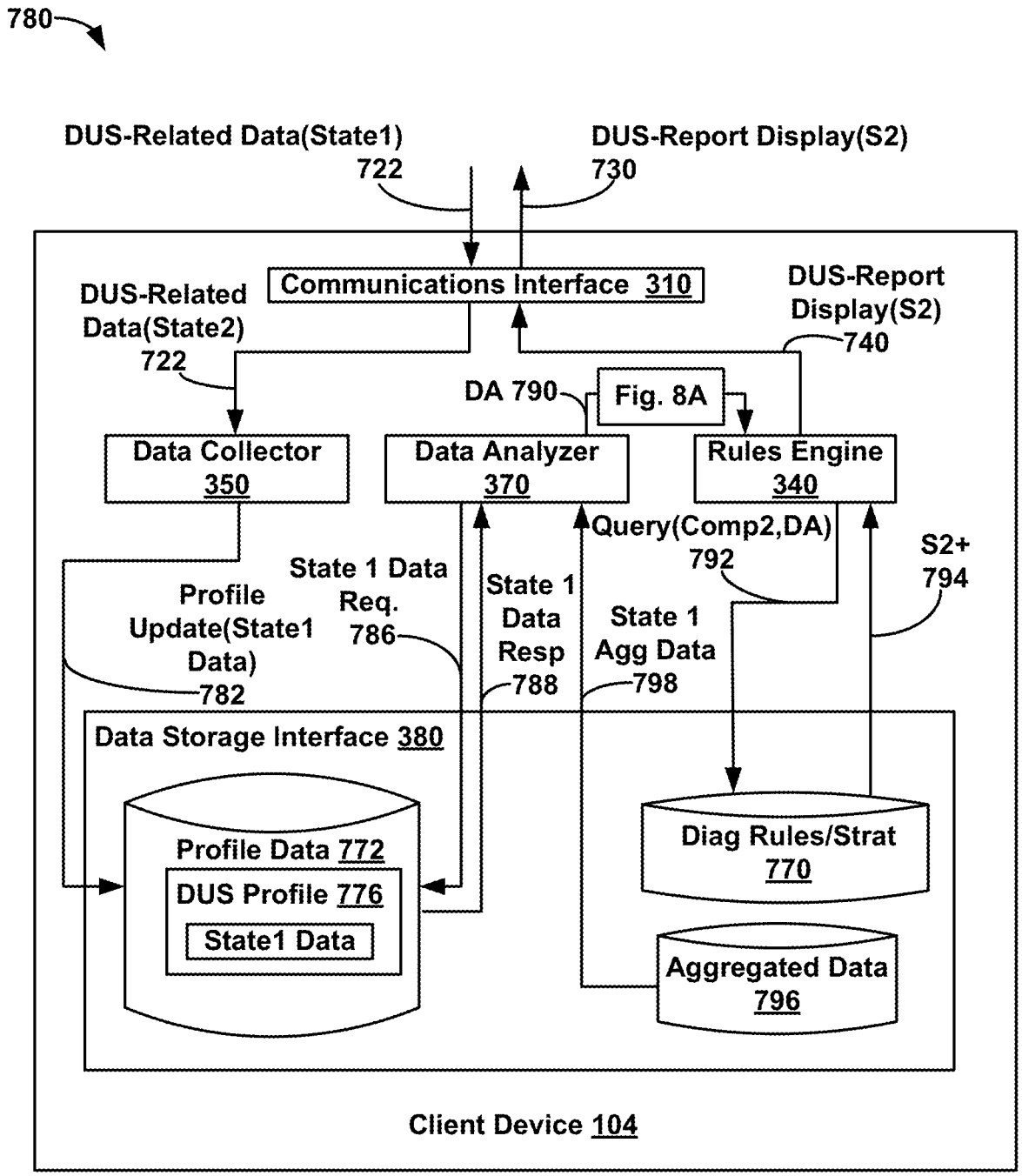
FIG. 7C shows an example scenario for processing DUS-related data and responsively generating a DUS-report display.

FIG. 7C shows an example scenario 780 for processing DUS-related data 722 and responsively generating DUS-report display 730. DUS-related data 722 related to first operating state State1 of DUS 102 is received at communications interface 310. In scenarios not shown in FIG. 7C, DUS-related data 732 can include complaint C2, which can in turn be analyzed by a text analyzer (e.g., text analyzer 360) to determine a complaint query. Rather, scenario 780 assumes C2 has already been analyzed by a text analyzer, such as described above with respect to FIGS. 3 and 7B.

Upon reception of DUS-related data 722, data collector 350 can update DUS profile 776 as needed to include data related to first operating state State1, using the techniques described above in the context of FIG. 3. FIG. 7C depicts DUS profile 776 updated to store data for first operating state State1 (shown in FIG. 7C as "State1 Data").

Data analyzer 370 can generate a differential analysis by comparing data of DUS 102 while operating in one or more "operating states." FIG. 7C shows data analyzer 370 communicating State1 data request 786 to profile data 772 to request data related to first operating state State1 DUS 102. In response, profile data 772 retrieves the data related to first operating state State1 from DUS profile 776 and communicates the retrieved data to data analyzer 370 via State1 data response 788.

Data analyzer 370 can compare data related to first operating state State1 with aggregated data 796. In some embodiments, aggregated data 796 can be equivalent to aggregated data 672 discussed above in the context of FIGS. 6B and 6C. In particular of those embodiments not shown in FIG. 7C, some or all of aggregated data 796 is not stored on client device 104; rather queries for aggregated data are sent via communications interface 310 for remote processing.

Data analyzer 370 can query aggregated data 796 to determine aggregated data for operating state State1 798 (shown in FIG. 7C as "State1 Agg Data"). Upon reception of data related to first operating state State1 and aggregated data 798, data analyzer 370 can generate differential analysis (DA) 790.

Figure 8A:
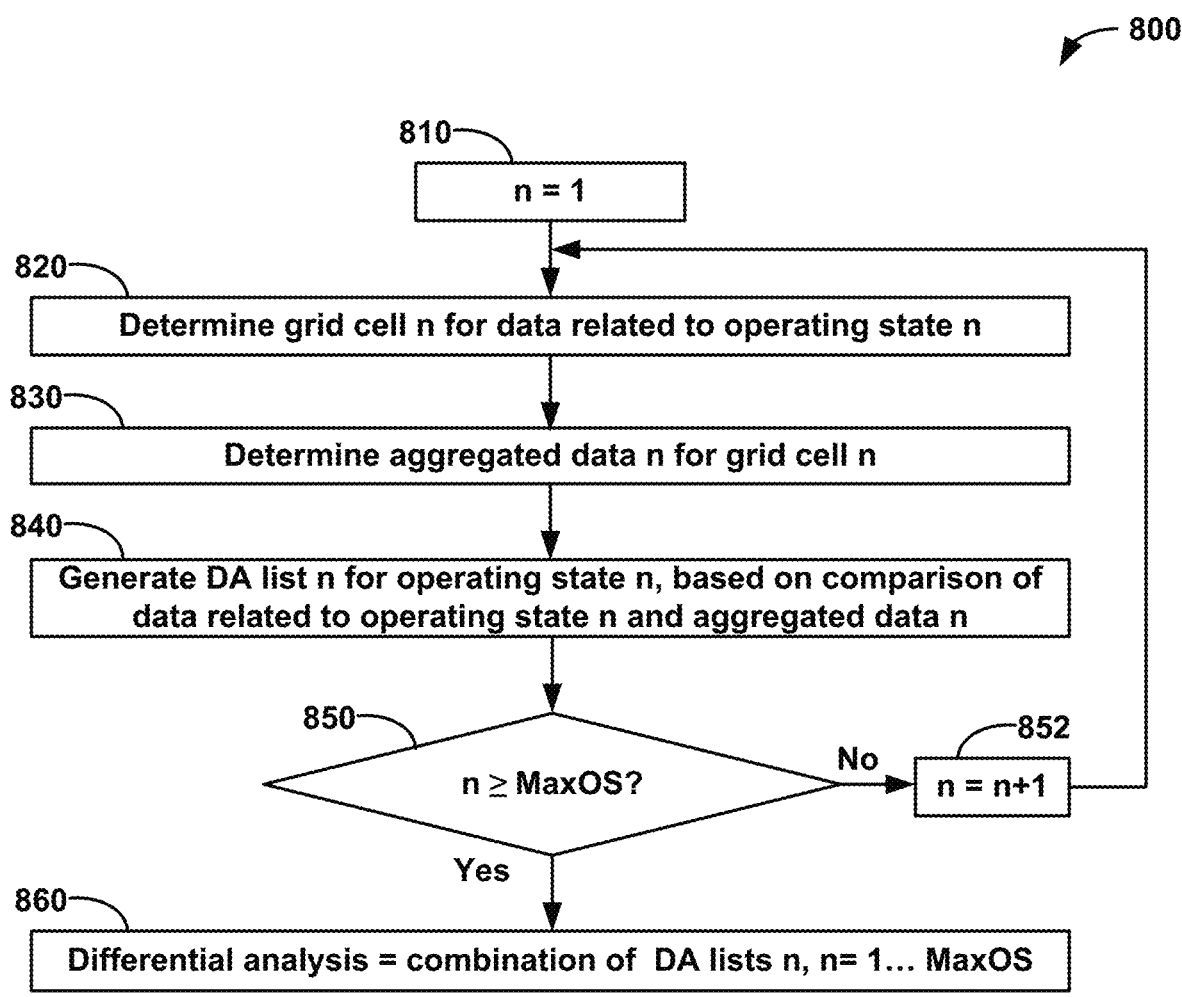
FIG. 8A depicts an example flow chart that illustrates functions for generating a differential analysis.

FIG. 8A depicts an example flow chart that illustrates functions 800 for generating differential analysis 790. At block 810, the operating state value n is set to 1. At block 820, a grid cell n is determined for data related to operating state n.

Figure 8B:
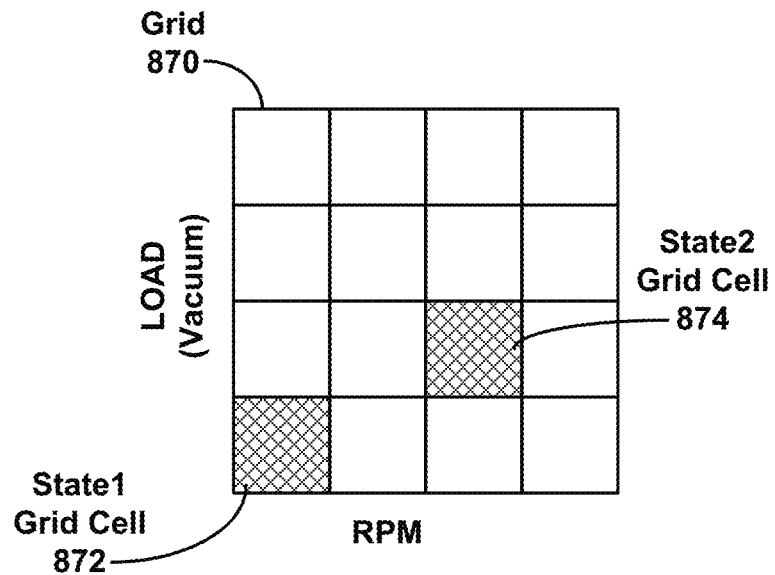
FIG. 8B shows an example grid with a grid cell corresponding to a first operating state and a grid cell corresponding to a second operating state.

FIG. 8B shows an example grid 870 with grid cell 872 corresponding to first operating state State1 and a grid cell 874 corresponding to second operating state State2. Grid 870 is a two-dimensional grid with revolutions per minute (RPM) on the horizontal axis of grid 870 and load on the vertical axis of grid 870.

In some embodiments, load can be determined based on a vacuum reading (e.g., manifold vacuum for a vehicle acting as DUS 102). Other values for either the horizontal axis and/or the vertical axis are possible as well. As such, each grid cell includes a range of revolutions per minute and a load range. The data related to an operating state can be examined to determine revolutions per minute data and load data. For a given operating state, the revolutions per minute data can be compared with the ranges of revolutions per minute data of the grid to determine a grid row for the given operating state and the load data can be compared with ranges of load data of the grid to determine a grid column for the given operating state. The grid cell for the given operating state is specified by the determined grid row/grid column pair. Other techniques for determining a grid cell for data related to an operating state are possible as well.

As shown in FIG. 8B, grid cells 872 and 874 can indicate that operating state State1 is an "idle" or similar no/low-load state and operating state State2 is a "cruising" or similar operation-under-normal-load state. Many other examples are possible as well, including but not limited to grids with fewer or more grid cells and/or non-square grids.

By determining that grid cell n is related to operating state n, the data can be verified as related to (or not related to) a specific operating state. For example, suppose that data D1 is received as being related to an "idle" operating state and that G1 is a grid cell determined for D1. By determining that G1 is a grid cell related to the "idle" operating state, D1 can be verified as being taken from of the specific "idle" operating state.

As another example, let D2 be data from a test requested from a "cruising" operating state, let G2 be a grid cell determined for D2 using the techniques mentioned above, and suppose that G2 does not relate to the "cruising" operating state (e.g., G2 relates to the idle operating state instead). Since D2 is not related to a grid cell for the specific "cruising" operating state, D1 is not verified to be in the specific "cruising" operating state.

If data is not verified to be a given operating state, a request can be generated to re-execute a test in the appropriate operating state. Continuing the above example, since D2 was not verified as being from the "cruising" operating state, another test can be requested to generate data from the "cruising" operating state.

In some cases, the data can be verified by other techniques than use of the grid cell. For example, a vehicle can be known, perhaps by direct observation and/or by data not used to assign grid cells, to be operating in a given operating state. For example, a driver of a vehicle operating in a "cruising" operating state could state that "I know I was consistently driving between 30 and 35 MPH throughout the test." At that point, the data can be verified as being from the given "cruising" operating state. Thus, erroneous data used to assign data to grid cells and subsequent operating states that failed to indicate the vehicle was in the "cruising" operating state is indicative of a problem. Consequent repair strategies to correct causes for the erroneous data can be utilized to address the problem.

Returning to FIG. 8A, at block 830, aggregated data n is determined based on grid cell n. For example, data analyzer 370 can query aggregated data 796 to retrieve data related to the DUS and for data within a grid cell (i.e., data taken with ranges of revolutions per minute and load data for grid cell n). Alternatively, data analyzer 370 can query aggregated data 796 to retrieve data related to the DUS and filter the retrieved data for data within grid cell n, thus determining aggregated data n. Other techniques for determining aggregated data n are possible as well.

At block 840, a differential analysis list (DA list) n is generated based on a comparison of data related to operating state n and aggregated data n. The differential analysis list can be generated based on data related to operating state n and aggregated data n that differs. Example techniques for determining differences between a data value related to operating state n and a value of aggregated data n include determining that: a data value is not the same as a value of aggregated data, the data value is not within a range of data values of aggregated data, the data value is either above or below a threshold value of the value(s) of aggregated data, the data value does not match one or more values of aggregated data, each of a number of data values is not the same, within a range, and/or within a threshold of an aggregated data value, computation(s) on the data value(s), perhaps including reference values, is/are compared to the reference values, and/or negations of these conditions.

A statistical analysis of the data related to the operating state n and/or the aggregated data n can be used to generate the differential analysis list n. For example, the statistical screening techniques discussed above in the context of FIG. 3 can be applied to the data related to the operating state n and/or the aggregated data n. The statistical screening can involve generating one or more statistics for aggregated data n and then comparing the data related to operating state n based on the generated statistics.

For example, suppose data related to the operating state n included a measurement value of Mn taken using a sensor Sens1. Further suppose that aggregated data n from sensor Sens1 indicated a mean measurement value of AggMeanMn with a standard deviation of AggSDMn. Then, a number of standard deviations NSDMn from the mean AggMeanMn for Meas1 could be determined, perhaps using the formula $$NSDMn = \frac{|AggeanMn - Mn|}{AggSDMn}.$$

Then, the measurement value Meas1 could be rated based on the number of standard deviations NSDMn and one or more threshold values. For example, suppose the ratings in Table 3 below were used to evaluate the number of standard deviations NSDMn:

TABLE 3

| Lower Threshold for NSDMn | Upper Threshold for NSDMn | Rating |
| --- | --- | --- |
| 0 | 1.999 . . . | Acceptable |
| 2 | 3.999 . . . | Marginal |
| 4 | Maximum value | Failing |

If NSDMn is between a lower threshold of 0 and an upper threshold of 1.999, then the measurement Mn can be rated as acceptable. Similarly, if NSDMn is between a lower threshold of 2 and an upper threshold of 3.999, then the measurement Mn can be rated as marginal. If NSDMn is greater than 4, then the measurement Mn can be rated as failing.

The techniques described above for the example measurement Mn and more advanced statistical analysis techniques including variances, correlations and/or principle component analyses can be applied to multiple variables (e.g., measurement Mn and other measurements Mn1, Mn2 . . . ) to perform a "multi-variable analysis" of the data related to the operating state n and the aggregated data. Further, relationships between two or more variables of the data related to the operating state n and the aggregated data can be examined during the multi-variable analysis.

One or more variables of the data, or principle contributors, can be chosen that are (a) related to the operating state n and/or the aggregated data and (b) separate the related to the operating state n and/or the aggregated data into different categories. The principle contributors can be determined through operations on the aggregated database using techniques to identify a reduced set of principle basis vectors and most likely failure vectors. The techniques include but are not limited to, singular value decomposition (SVD), correlations and/or variances. Projecting these vectors onto the space of real vehicle parameters and variables gives rise to the diagnostic strategies and prognostics for a vehicle.

As a simplified example, suppose that if both measurements Mn and Mn1 were failing, then a failure of sensor Sens1 is implicated, but Sens1 is not implicated when Mn is failing and Mn1 is not failing. Taking this example to higher dimensions, consider a situation where there are a large number LN of monitored parameters (e.g., LN≥30) for a vehicle. There can be patterns within reduced data sets that exist which will implicate a fault, and that the different patterns exhibited within these LN parameters will indicate different vehicle faults. Through a singular value decomposition analysis, and projections onto the real vector space, subsets of parameters can be identified for consideration as principle basis vectors. The subsets of parameters can be grouped and monitored for different faults. When the subset of parameters exhibit certain conditions that can be monitored using rules in the rules engine, an appropriate repair strategy can be determined.

Multi-variable correlation analysis can be used to compare data related to operating state n and aggregated data n. For example, suppose a vector $V_{AD}$ includes a number SN of sensor values of aggregated data related a particular complaint, including values for one or more principle components, and also suppose that the data related to operating state n includes a vector $V_{NAD}$ of SN sensor values of non-aggregated data from a device-under-service with the particular complaint, also including values for one or more principle components.

Then, a correlation analysis can be run between the data in the vectors $V_{AD}$ and $V_{NAD}$. For example, a "pattern correlation" or Pearson product-moment correlation coefficient can be calculated between $V_{AD}$ and $V_{NAD}$. The Pearson product-moment correlation coefficient ρ for the vectors $V_{AD}$ and $V_{NAD}$ can be determined as $$\rho = \frac{\text{cov}(V_{AD}, V_{NAD})}{\sigma(V_{AD})\sigma(V_{NAD})},$$

where −1≤ρ≤+1, cov(X,Y) is the covariance of X and Y, and σ(X) is the standard deviation of X. ρ indicates the correlation a.k.a. linear dependence between the two vectors, with ρ=+1 when a linear relationship between the vectors exists, ρ=−1 when the values $V_{AD}$ and $V_{NAD}$ lie on a line such that $V_{AD}$ increases when $V_{NAD}$ decreases, and ρ=0 when there is no linear correlation between $V_{AD}$ and $V_{NAD}$.

Thus, when ρ is nearly or equal to 1, there may be a nearly or actual linear relationship between the aggregated data $V_{AD}$ and the corresponding input data from the vehicle under test $V_{NAD}$. However, if ρ is more than a predetermined threshold amount less than 1 (e.g., for a predetermined threshold amount of 0.15, then ρ<=0.85), an inference can be made that there is likely no linear correlation between $V_{AD}$ and $V_{NAD}$. Based on this inference, the data in $V_{AD}$ and $V_{NAD}$ can be considered to be unrelated. When $V_{AD}$ and $V_{NAD}$ are determined to be unrelated, since the data in $V_{AD}$ is aggregated or valid/baselined data, another inference can be drawn that $V_{NAD}$ has invalid data. Thus, when ρ is more than the predetermined threshold amount less than 1, one or more repair strategies can be suggested to get the data of $V_{NAD}$, including values of principle components, closer to the data in $V_{AD}$.

Another simplified example of multi-variable analysis can involve generating an n-dimensional space from a data set, such as the aggregated data, baseline data, and/or reference data, for one or more devices-under-test. Each dimension in the n-dimensional space can represent a value of interest of a device-under-test, such as, but not limited to values of device-related data, values of sensor data from the device-under-test, reference and/or baseline data values, and statistics based on these values.

A basis of n vectors for the n-dimensional space can be determined; that is each vector Vbasis(i), n≥i≥1, of the basis is linearly independent of the other n−1 Vbasis vectors in the basis. In some embodiments, rules engine 340 and/or rules engine 440 can utilize the n-dimensional space. For example, rules engine 340 and/or rules engine 440 can receive n-dimensional input vector(s) corresponding to one or more measurements taken from one or more tests and perform vector and/or other operations to compare the input n-dimensional vector to one or more n-dimensional vectors of baseline data that share a basis with the input n-dimensional vector. In particular, test data can be mapped into the n-dimensional vector space as an n-dimensional vector and rules engine 340 and/or rules engine 440 can process the n-dimensional vector(s) of baseline data and/or the input n-dimensional vector(s).

For example, in diagnosing tires, an example n=4 dimensional space for tires of a given manufacturer/model pair can include: tire pressure tp (in PSI), tire mileage tm (in miles), tire temperature tt (in degrees Fahrenheit), and tire age ta (in years). Then, for this example, a basis set of Vbasis vectors for this space can be:

$$\begin{bmatrix} tp & 0 & 0 & 0 \\ 0 & tm & 0 & 0 \\ 0 & 0 & tt & 0 \\ 0 & 0 & 0 & ta \end{bmatrix}.$$

Continuing this example, a 4-dimensional vector using the example basis set of vectors for test result indicating a 3-year-old tire has pressure of 30 pounds/square inch for a 3 year old tire is: $[30\ 0\ 0\ 3]^T$.

Dimensions in the n vector space can be classified. For example, some dimensions can be classified as "static" dimensions, while others can be classified as "dynamic"

dimensions. A static dimension is a dimension that cannot be readily changed during a repair session of a DUS, if at all. For example, the tire age ta dimension, when expressed in years, cannot be readily changed during a one-day repair session. In contrast, dynamic dimensions can readily be changed during a repair session. For example, the tire pressure tp dimension can be changed by a technician with access to an air hose, to add air and thus increase tp, and a screwdriver to release air and thus decrease tp. As such, measurements related to static dimensions can be used to classify one or more components of a DUS, and measurements related to dynamic dimensions can be adjusted during maintenance and/or repair procedures.

Once a set of values of interest and corresponding basis vectors has been determined for the n-dimensional vector space, then baseline values can be determined in the n-dimensional space, and adjustments to the device-under-test that correspond to the values of interest can be performed to align test-related data with baseline values. Continuing the 4-dimensional tire values, suppose that baseline data for a 3-year tire at 70 degrees Fahrenheit is: $[28\ tm\ 70\ 3]^T$ where tm is in the range of 10000*ta and 20000*ta; that is, between 40,000 and 80,000 miles, and that an example input vector of test-related data is: $[37\ 50000\ 70\ 3]^T$. Taking a difference between the baseline data vector and the input vector leads to an example difference vector of $[-9\ tm\ 0\ 0]^T$; thus, to get the tire with the baseline data, the tire pressure has to be reduced by 9 PSI, as can be seen in the −9 value for the tp entry in the example difference vector. Rules engine 340 and/or rules engine 440 can then fire a rule to provide a strategy or sub-strategy to lower the tire pressure. For example, one strategy or sub-strategy could be that tire pressure can be lowered by pressing a screwdriver onto a pin of a valve stem, permitting air to escape, and thus lowering the air pressure.

In some embodiments, rules engine 340 and/or rules engine 440 can determine the tp dimension is a dynamic dimension and thus a sub-strategy can be used to adjust the value of the tp value for the DUT. Based on this determination, rules engine 340 and/or rules engine 440 can identify the above-mentioned sub-strategy to lower tire pressure.

Other thresholds, ratings, rating schemes, single and multi-variable analyses, vectors, bases, data differences, and/or techniques thereof are possible as well.

At block 850, a comparison is made between the operating state value n and a maximum number of operating states ("MaxOS" in FIG. 8B). For the example shown in FIGS. 7A-7C, the maximum number of operating states is two. If the operating state value n is greater than or equal to the maximum number of operating states, the functions 800 continue at block 860; otherwise, the functions 800 continue at block 852.

At block 852, the operating state value n is incremented by 1 and the functions 800 continue at block 820.

At block 860, differential analysis 790 is determined by combining the differential analysis lists n, where n ranges from 1 to the maximum number of operating states. The differential analysis lists can be combined by concatenating all lists, taking a union of the differential analysis lists, selecting some but not all data from each differential analysis list, or selecting some but not all differential analysis lists, and/or filtering each list for common differences. As an example of filtering for common differences, suppose n=2 with differential analysis list 1 including differences for data from three sensors: S1, S3, and S6, and differential analysis list 2 including differences for data from four sensors: S2, S3, S6, and S8. Then, the common differences for both example lists would be the data from sensors S3 and S6. Other techniques for combining the differential analysis lists are possible as well.

In some scenarios, the maximum number of operating states can be equal to one. In these scenarios, the differential analysis would involve the comparison of block 840 between data related to operating state 1 and aggregated data for operating state 1 and the combining operation of block 860 could return the differential analysis list for operating state 1. As such, the differential analysis for only one operating state involves a comparison of data related to the operating state and aggregated data for the operating state.

Thus, functions 800 can be used to generate a differential analysis by a comparison of data related to one or more operating states and aggregated data for those one or more operating states utilizing a grid of operating states.

Returning to FIG. 7C, data analyzer 370 can communicate differential analysis 790 to rules engine 340. Upon reception of differential analysis 790, rules engine 340 can communicate query 792 with previously-determined complaint data (shown in FIG. 7C as "Comp2") and differential analysis 790 to diagnostic rules and strategy data base 770 (shown in FIG. 7C as "Diag Rules/Strat 770") using the techniques described above in the context of FIGS. 3 and 4.

In response, diagnostic rules and strategy data base 770 can communicate strategy 794 (shown in FIG. 6B as "S2+'") including one or more rules and associated sub-strategies to rules engine 340. Using the techniques described above in the context of FIGS. 3, 4, and 6C, rules engine 340 can determine which rule(s) fire and their associated sub-strategy/sub-strategies. In scenario 780, rules engine 740 generates DUS-report display 740 that can include some or all of differential analysis 790 and/or some or all of the sub-strategies of strategy 794 (collectively shown in FIG. 7C as "S2") and communicates DUS-report display 740 to communication interface 310. Communications interface 310 can then send DUS-report display 740.

IV. Example Operation

Figure 9:
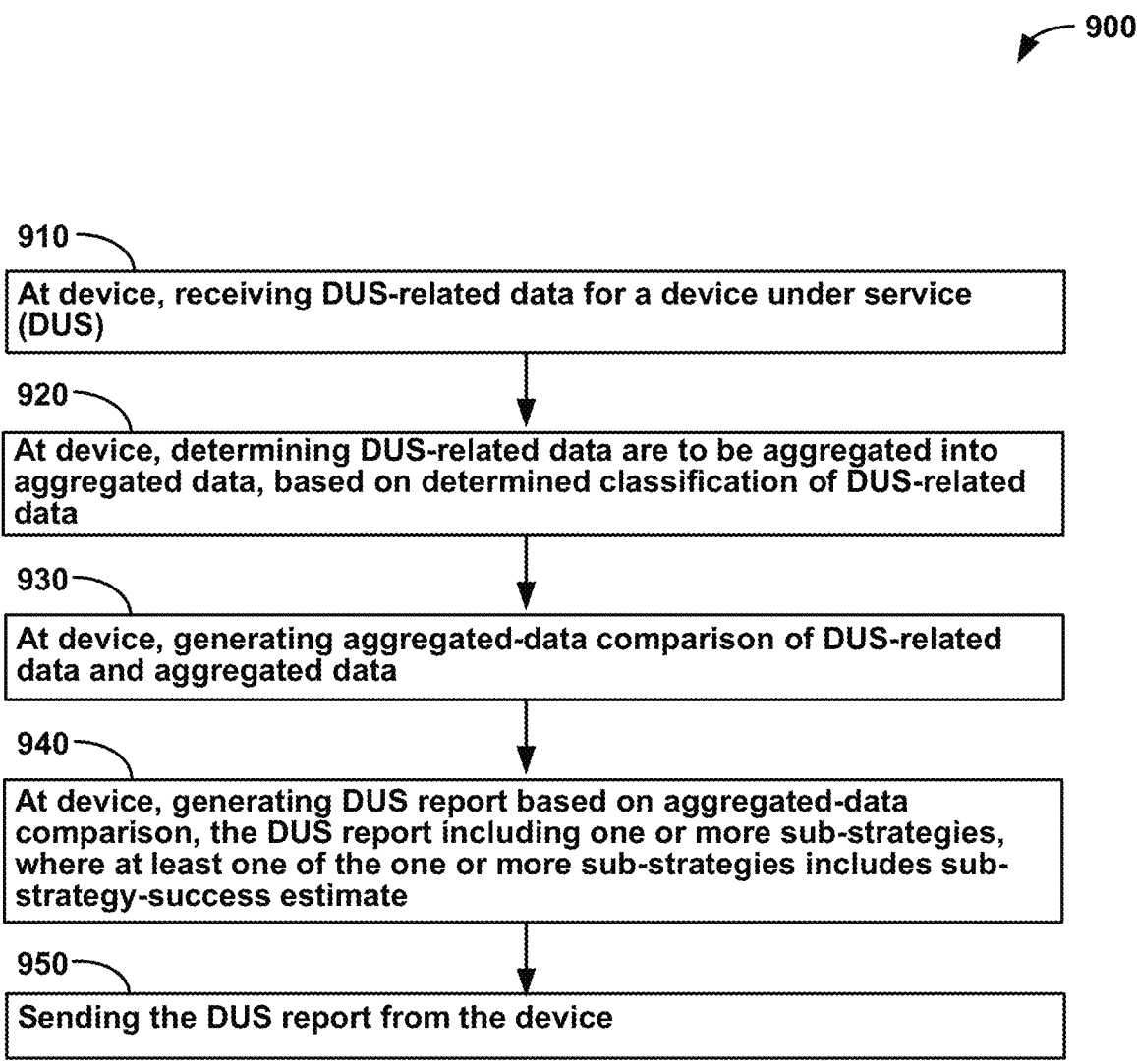
FIG. 9 depicts an example flow chart that illustrates functions that can be carried out in accordance with an example embodiment.

FIG. 9 depicts an example flow chart that illustrates functions 900 that can be carried out in accordance with an example embodiment. For example, the functions 900 can be carried out by one or more devices, such as server device 106 and/or client device 104 described in detail above in the context of FIGS. 1-7C.

Block 910 includes receiving DUS-related data for a device under service. For example, the DUS-related data could be received in a DUS-related data communication, such as described above in detail with respect to at least FIGS. 6A-7C. In some embodiments, the DUS-related data includes DUS-test data obtained from a DUS test performed on the DUS.

Block 920 includes determining that the DUS-related data is to be aggregated into aggregated data. In some embodiments, the determination to aggregate the DUS-related data can be based on a classification of the DUS-related data. The determination to aggregate the DUS-related data is described above in detail with respect to at least FIGS. 4, 6A, 6B, and 6C.

In some embodiments determining that the DUS-related data includes: determining one or more DUS attributes from the DUS-related data, selecting baseline data from the aggregated data based on the one or more DUS attributes, generating a baseline comparison between DUS-test data and baseline data, determining the classification for the DUS-related data based on the baseline comparison, and aggregating the DUS-related data into the aggregated data based on the classification.

Block 930 includes generating an aggregated-data comparison of the DUS-related data and the aggregated data. Comparisons of DUS-related data and aggregated data are described above in detail with respect to at least FIGS. 3, 4, and 6A-8B.

In some embodiments, generating the aggregated-data comparison of the DUS-related data and the aggregated data includes: (i) determining a basis of one or more vectors representing at least part of the aggregated data, (ii) determining a baseline-data vector of the baseline data, the baseline-data vector utilizing the basis, (iii) determining a DUS-data vector of the DUS-related data, the DUS-data vector utilizing the basis, and (iv) determining a vector difference between the baseline-data vector and the DUS-data vectors. Generating an aggregated-data comparison utilizing a vector basis, uses for bases, and uses for vector differences are discussed above in more detail at least in the context of FIG. 8A.

In some embodiments, generating the aggregated-data comparison of the DUS-related data and the aggregated data includes generating a pattern correlation between at least some of the DUS-related data and at least some of the aggregated data. Pattern correlations are discussed above in more detail at least in the context of FIG. 8A.

Block 940 includes generating a DUS report based on the aggregated-data comparison. In some embodiments, the DUS report can include one or more sub-strategies; and in particular of these embodiments, at least one of the one or more sub-strategies can include sub-strategy-success estimate. DUS reports, sub-strategies, and sub-strategy-success estimates are described above in detail with respect to at least FIGS. 3, 4, and 6A-8B.

In other embodiments, the DUS-related data includes complaint data; in these embodiments, generating the DUS report includes generating the DUS report based on the complaint data. In particular of these embodiments, generating the DUS report includes: determining at least one complaint based on the complaint data, generating a query based on the at least one complaint, querying a rules engine of the device using the query; and in response to the query, receiving the one or more sub-strategies. In some of the particular embodiments, the complaint data includes complaint text; in these embodiments, determining the at least one complaint includes: generating a textual analysis of the complaint text and determining the at least one complaint based on the textual analysis. In other of the particular embodiments, the DUS-related data includes DUS-test data obtained from a first test performed on the DUS; in these embodiments generating the aggregated-data comparison includes performing a statistical analysis of the DUS-test data and the aggregated data, and generating the DUS report includes generating the query based on the statistical analysis and the at least one complaint. In some of the other particular embodiments, the DUS-related data and the aggregated data each comprise data for a plurality of variables, and wherein the performing the statistical analysis comprises performing a multi-variable analysis of the data for at least two variables of the plurality of variables.

In still other embodiments, generating the DUS report based on the aggregated-data comparison can include determining at least one of the one or more sub-strategies based on a vector difference. Use of vector differences to determine sub-strategies is discussed above in more detail at least in the context of FIG. 8A.

In other embodiments, the DUS-related data includes complaint data, and generating the aggregated-data comparison of the DUS-related data and the aggregated data includes: (i) determining a reduced data set of the aggregated data based on the complaint data, (ii) determining a set of basis vectors based on the reduced dataset, and (iii) identifying one or more principle parameter components for a complaint in the complaint data based on a projection of the basis vectors onto the DUS-related data. In these embodiments, generating the DUS report based on the aggregated-data comparison includes: (iv) applying one or more rules about the principle parameter components, and (v) determining a sub-strategy based on the applied one or more rules. Use of principle parameter components is discussed above in more detail at least in the context of FIG. 8A.

Block 950 includes sending the DUS report. Sending the DUS report is described in more detail with respect to at least FIGS. 3, 4, 6A, 6C, 7A, and 7C.

In some embodiments, functions 900 can further include generating a diagnostic request based on the aggregated-data comparison at the device, where the diagnostic request for requesting data related to a second DUS test performed on the DUS. In particular of these embodiments, the diagnostic request includes instructions for performing the second DUS test.

In still other embodiments, functions 900 can further include receiving success-related data on a first sub-strategy of the one or more sub-strategies at the device and adjusting the sub-strategy-success estimate of at least the first sub-strategy based on the success-related data at the device.

Figure 10:
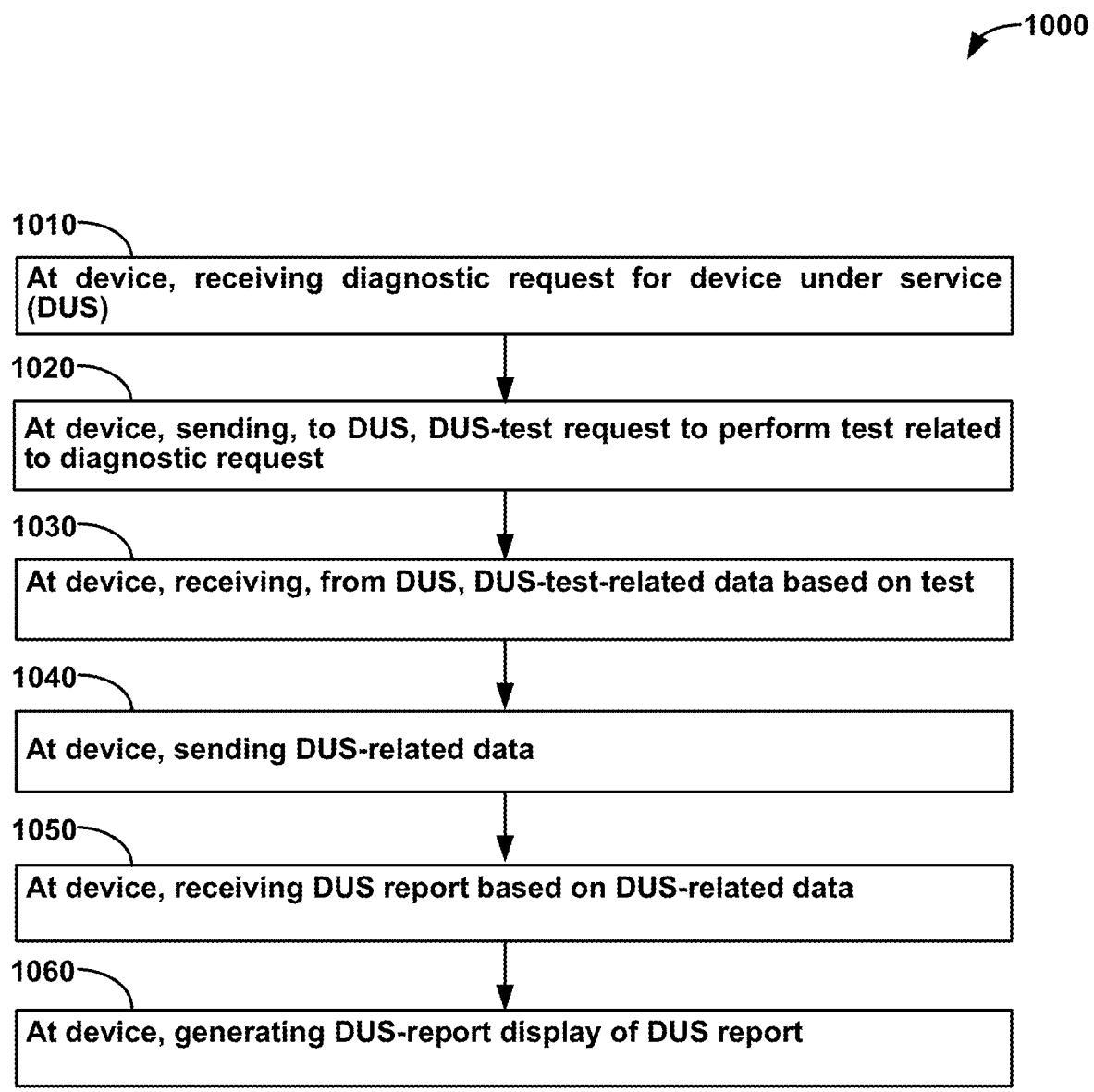
FIG. 10 is another flow chart depicting functions that can be carried out in accordance with an example embodiment.

FIG. 10 depicts an example flow chart that illustrates functions 1000 that can be carried out in accordance with an example embodiment. For example, the functions 1000 can be carried out by one or more devices, such as server device 106 and/or client device 104 described in detail above in the context of FIGS. 1-7C.

Block 1010 includes receiving a diagnostic request for a DUS. Diagnostic requests for devices under service are described above in detail with respect to at least FIGS. 3-7C.

Block 1020 includes sending a DUS-test request to perform a test related to the diagnostic request. DUS test requests and tests of DUSs are described above in detail with respect to at least FIGS. 3, 4, and 6A-7C.

Block 1030 includes receiving DUS-related data based on the test. Receiving DUS-related data is described above in detail with respect to at least FIGS. 3, 4, and 6A-7C.

Block 1040 includes sending the DUS-related data. Sending DUS-related data is described above in detail with respect to at least FIGS. 3, 4, and 6A-7C. In some embodiments, the DUS-related data is sent via a network-communication interface.

Block 1050 includes receiving a DUS report based on the DUS-related data. DUS reports are described above in detail with respect to at least FIGS. 3, 4, and 6A-7C. In some embodiments, the DUS report is received via a network-communication interface.

Block 1060 includes generating a DUS-report display of the DUS report. Generating the DUS-report display is described in more detail with respect to at least FIGS. 3, 6A, 7A, and 7C. In some embodiments, the DUS-report display is displayed via a user interface.

Figure 11:
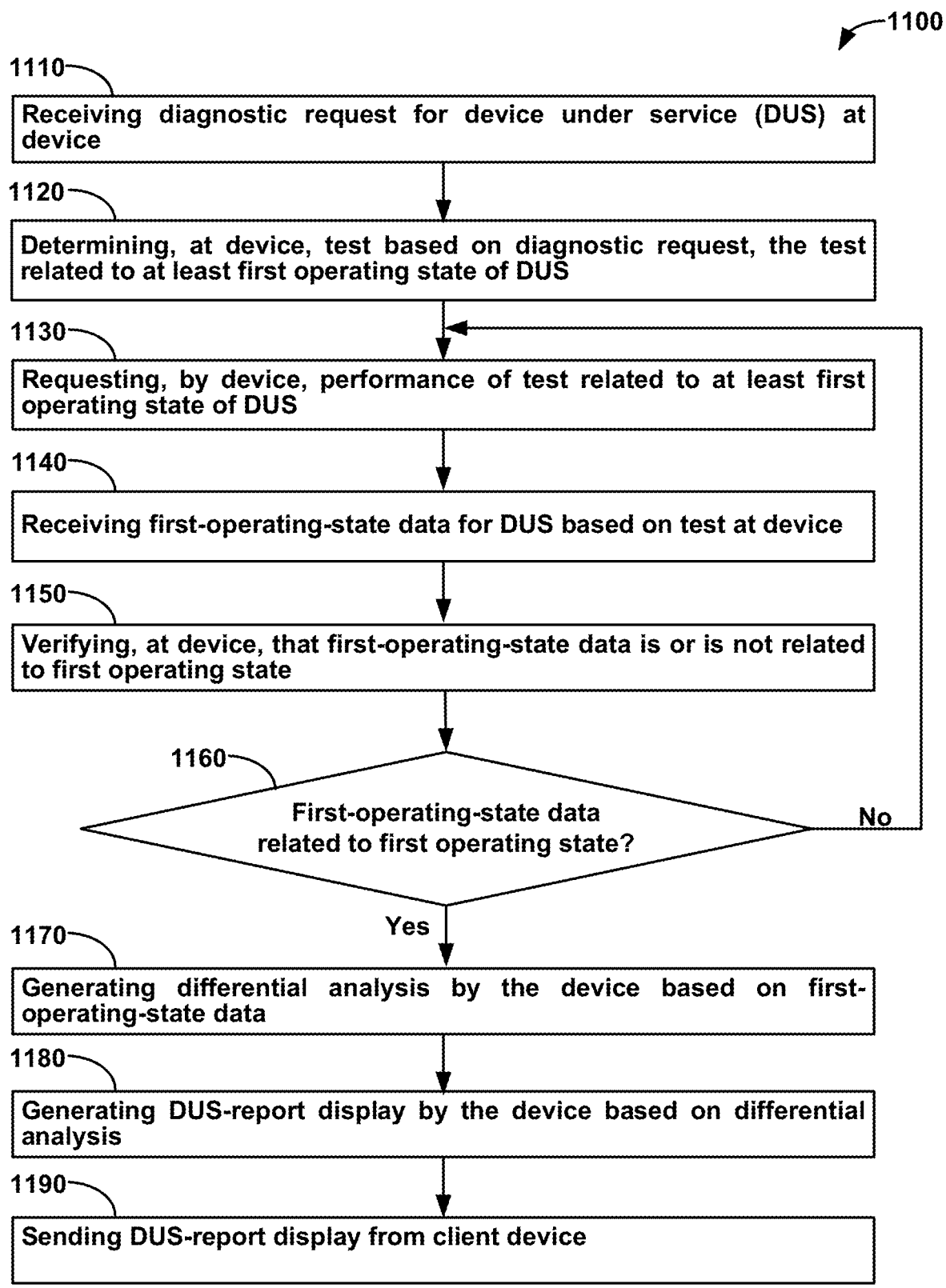
FIG. 11 is yet another flow chart depicting functions that can be carried out in accordance with an example embodiment.

FIG. 11 depicts an example flow chart that illustrates functions 1100 that can be carried out in accordance with an example embodiment. For example, the functions 1100 can be carried out by one or more devices, such as server device 106 and/or client device 104 described in detail above in the context of FIGS. 1-7C.

Block 1110 includes receiving a diagnostic request to diagnose a DUS. Diagnostic requests for devices-under-service are described above in detail with respect to at least FIGS. 3-7C.

Block 1120 includes determining a test based on the diagnostic request. The test can be related to a first operating state of the DUS. Operating states of devices-under-service and tests related to those operating states are discussed above in detail with respect to at least FIGS. 3, 4, and 7A-7C. In some embodiments, the test includes a plurality of tests for the DUS.

Block 1130 includes requesting performance of the test at the first operating state of the DUS. Operating states of devices-under-service and tests at those operating states are discussed above in detail with respect to at least FIGS. 3, 4, and 7A-7C.

Block 1140 includes receiving first-operating-state data for the DUS based on the test. Operating states of devices-under-service and data from tests at those operating states are discussed above in detail with respect to at least FIGS. 3, 4, and 7A-7C. In some embodiments, the first-operating-state data includes data from at least two sensors associated with the DUS.

Block 1150 includes verifying that the first-operating-state data is or is not related to the first operating state. In some embodiments, verifying that the first-operating-state is related to the first operating state includes: determining a first grid cell for the first-operating state data, determining an operating state related to the first grid cell, and determining that the operating state related to the first grid cell is the first operating state. In some of these embodiments, verifying that the first-operating-state is not related to the first operating state includes: determining a first grid cell for the first-operating state data, determining an operating state related to the first grid cell, and determining that the operating state related to the first grid cell is not the first operating state. Verifying that data is or is not related to an operating state is discussed above in more detail with respect to at least FIG. 8.

At block 1160, a decision is made as to whether the first-operating-state data is related to the first operating state. If the first-operating-state data is related to the first operating state, control passes to block 1170. However, if the first-operating-state data is not related to the first operating state, control passes to block 1130.

Block 1170 includes generating a differential analysis of the first-operating-state data. Differential analyses of data from devices-under-service are discussed above in detail with respect to at least FIGS. 3, 4, and 7A-8B. In some embodiments, generating the differential analysis includes: determining first aggregated data for a first grid cell, and generating a first differential-analysis list for the first operating state based on a comparison of the first-operating-state data and the first aggregated data.

Block 1180 includes generating a DUS-report display. The DUS-report display can be based on the differential analysis. Generating DUS-report displays is discussed above in detail with respect to at least FIGS. 3, 4, and 6A-7C.

Block 1190 includes sending the DUS-report display. Sending DUS-report displays is discussed above in detail with respect to at least FIGS. 3, 4, and 6A-7C.

V. Conclusion

Example embodiments of the present invention have been described above. Those skilled in the art will understand that changes and modifications may be made to the described embodiments without departing from the true scope and spirit of the present invention, which is defined by the claims.

We claim:
1. A method, comprising:
receiving, at a computing device, a diagnostic request to diagnose a device-under-service;
determining, at the computing device based on the diagnostic request, a first test, wherein the first test is defined to be performed while the device-under-service is operating in a first operating state of the device-under-service during a testing interval of time;
determining, at the computing device based on a communication received from the device-under-service, the device-under-service is operating in the first operating state;
transmitting, by the computing device to the device-under-service in response to the computing device determining the device-under-service is operating in the first operating state based on the communication received from the device-under-service, one or more messages arranged according to an on-board diagnostic protocol to control operation of a component on board the device-under-service as part of performing the first test one or more times during the testing interval of time while the device-under-service is operating in the first operating state;
receiving, at the computing device, first data related to the device-under-service based on performance of the first test at the first operating state of the device-under-service one or more times during the testing interval of time, wherein the first data is indicative of two or more measurements;
classifying, at the computing device, the first data related to the device-under-service as first operating-state data based on reliability of the first data related to the device-under-service and verification of the first data related to the device-under-service being related to the first operating state and the testing interval of time;
generating, at the computing device, a differential analysis based on the first operating-state data,
generating, at the computing device, a report display by the device based on the differential analysis, and
sending, by the computing device, the report display, wherein the report display includes one or more sub-strategies including an additional test to perform on the device-under-service during diagnosis and repair of the device-under-service to address a complaint.

2. The method according to claim 1, wherein the first operating-state data comprises data from at least two sensors associated with the device-under-service.

3. The method according to claim 1, wherein the first test comprises a plurality of tests for the device-under-service.

4. The method according to claim 1, wherein verifying that the first operating-state data is related to the first operating state comprises:
determining a first grid cell for the first operating-state data;
determining an operating state related to the first grid cell; and
determining that the operating state related to the first grid cell is the first operating state.

5. The method according to claim 4, wherein generating the differential analysis based on the first operating-state data comprises:

determining first aggregated data for the first grid cell; and
generating a first differential-analysis list for the first operating state based on a comparison of the first operating-state data and the first aggregated data.

6. The method according to claim 5, wherein the comparison of the first operating-state data and the first aggregated data is based on generating a pattern correlation between at least some of the first operating-state data and the first aggregated data.

7. The method according to claim 1, further comprising:
determining that the first data related to the device-under-service is to be aggregated into aggregated data based on a classification of the first data related to the device-under-service, wherein:
the diagnostic request comprises complaint data,
generating the differential analysis comprises:
determining a reduced data set of the aggregated data based on the complaint data;
determining a set of basis vectors based on the reduced data set; and
identifying one or more principle parameter components for a complaint in the complaint data based on a projection of the basis vectors onto the first data related to the device-under-service; and
generating the report display based on the differential analysis comprises:
applying one or more rules about the principle parameter components; and
determining a sub-strategy based on the applied one or more rules.

8. The method according to claim 1, wherein the diagnostic request includes a diagnostic trouble code configured according the an on-board diagnostic protocol.

9. The method according to claim 1, wherein:
the diagnostic request includes a textual complaint; and
the method further comprises:
analyzing, by the computing device, the textual complaint to determine one or more words within the textual complaint indicative of:
a requested service,
a component in the device-under-service, or
an operating state of the device-under-service.

10. The method according to claim 1, wherein:
the computing device includes a measurement device including a digital volt meter or a digital volt ohm meter, and
the first operating-state data includes measurement data obtained by the measurement device.

11. The method according to claim 1, wherein the request for performance of the first test at the first operating state of the device-under-service is arranged according to the on-board diagnostic protocol.

12. The method according to claim 1, further comprising:
determining, at the computing device, whether the device-under-service is in the first operating state of the device-under-service; and
outputting, by the computing device, an instruction to prompt changing an operating state of the device-under-service to the first operating state of the device-under-service if the computing device determines that the device-under-service is not operating in the first operating state of the device-under-service.

13. The method according to claim 1, wherein the first operating state is an idle operating state, a cruising operating state, a cranking operating state, or a high-speed operating state.

14. The method according to claim 1, wherein the device-under-service displays progress information regarding a status of tests being performed for multiple operating states of the device-under-service.

15. The method according to claim 14, wherein the status of tests is shown using multiple status bars graphically and textually.

16. A computing device comprising:
a non-transitory computer-readable memory;
a processor; and
program instructions stored on the non-transitory computer-readable memory and executable by the processor to:
receive a diagnostic request to diagnose a device-under-service;
determine, based on the diagnostic request, a first test, wherein the first test is defined to be performed while the device-under-service is operating in a first operating state of the device-under-service during a testing interval of time;
determine, based on a communication received from the device-under-service, the device-under-service is operating in the first operating state;
transmit, to the device-under-service in response to the computing device determining the device-under-service is operating in the first operating state based on the communication received from the device-under-service, one or more messages arranged according to an on-board diagnostic protocol to control operation of a component on board the device-under-service as part of performing the first test one or more times during the testing interval of time while the device-under-service is operating in the first operating state;
receive first data related to the device-under-service based on performance of the first test at the first operating state of the device-under-service one or more times during the testing interval of time, wherein the first data is indicative of two or more measurements;
classify the first data related to the device-under-service as first operating-state data based on reliability of the first data related to the device-under-service and verification of the first data related to the device-under-service being related to the first operating state and the testing interval of time;
generate a differential analysis based on the first operating-state data,
generate a report display by the device based on the differential analysis, and
send the report display, wherein the report display includes one or more sub-strategies including an additional test to perform on the device-under-service during diagnosis and repair of the device-under-service to address a complaint.

17. A computing device according to claim 16, further comprising:
a user interface, wherein the program instructions are executable by the processor to display the report display via the user interface.

18. A computing device according to claim 16, further comprising:
a measurement device including a digital volt meter or a digital volt ohm meter, and
the first operating-state data includes measurement data obtained by the measurement device.

19. A computing device according to claim 16, wherein:
the computing device is arranged as a server device operatively connectable to a client device via a network, and
the program instructions to send the report display include program instructions for the server device to send the report display to the client device via the network.

20. A computing device according to claim 16, further comprising:
a network communication interface including a wireless interface, wherein the program instructions to transmit the request for performance of the first test at the first operating state of the device-under-service include instructions to transmit the request using the wireless interface.

* * * * *

UNITED STATES PATENT AND TRADEMARK OFFICE
CERTIFICATE OF CORRECTION

PATENT NO. : 12,282,402 B2  
APPLICATION NO. : 17/325184  
DATED : April 22, 2025  
INVENTOR(S) : Mark Theriot et al.

Page 1 of 1

It is certified that error appears in the above-identified patent and that said Letters Patent is hereby corrected as shown below:

In the Claims

Claim 8, Column 35, Line 34 should read:
according to the on-board diagnostic protocol.

Signed and Sealed this
Twentieth Day of May, 2025

Coke Morgan Stewart
*Acting Director of the United States Patent and Trademark Office*